(12) United States Patent
Fujiwara

(10) Patent No.: US 7,103,275 B2
(45) Date of Patent: Sep. 5, 2006

(54) OPTICAL TRANSMISSION SYSTEM

(75) Inventor: Haruo Fujiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 567 days.

(21) Appl. No.: 10/073,195

(22) Filed: Feb. 13, 2002

(65) Prior Publication Data

US 2003/0011855 A1    Jan. 16, 2003

(30) Foreign Application Priority Data

Jul. 16, 2001    (JP) ............................. 2001-215027

(51) Int. Cl.
*H04B 10/08* (2006.01)
*H04B 17/00* (2006.01)
*H04B 10/02* (2006.01)

(52) U.S. Cl. ............................. 398/31; 398/30; 398/33; 398/177; 398/173; 398/181

(58) Field of Classification Search ................. 398/30, 398/31, 33, 104, 105, 107, 177, 181, 195, 398/79, 173
See application file for complete search history.

(56) References Cited

U.S. PATENT DOCUMENTS

| | | | | |
|---|---|---|---|---|
| 4,300,239 A | * | 11/1981 | Wakabayashi et al. | 398/37 |
| 4,313,224 A | * | 1/1982 | Wakabayashi et al. | 398/16 |
| 5,274,496 A | * | 12/1993 | Fujiwara et al. | 398/177 |
| 5,296,957 A | * | 3/1994 | Takahashi et al. | 398/177 |
| 5,737,105 A | * | 4/1998 | Ohta et al. | 398/18 |
| 5,883,735 A | * | 3/1999 | Sugiyama et al. | 359/341.42 |
| 6,259,554 B1 | * | 7/2001 | Shigematsu et al. | 359/337 |
| 6,483,616 B1 | * | 11/2002 | Maddocks et al. | 398/1 |
| 6,658,211 B1 | * | 12/2003 | Yokoyama | 398/79 |
| 6,681,079 B1 | * | 1/2004 | Maroney | 398/15 |
| 6,708,004 B1 | * | 3/2004 | Homsey | 398/177 |
| 6,804,469 B1 | * | 10/2004 | Kasahara et al. | 398/177 |

FOREIGN PATENT DOCUMENTS

| | | |
|---|---|---|
| EP | 0 935 356 | 8/1999 |
| EP | 1 122 898 | 8/2001 |
| JP | 03042927 A | 2/1991 |
| JP | 03205929 A | 9/1991 |

OTHER PUBLICATIONS

United Kingdom Partial Search Report.
Japanese Abstract No. 2000 183820A, dated Jun. 30, 2000.

* cited by examiner

*Primary Examiner*—Jason Chan
*Assistant Examiner*—Quan-Zhen Wang
(74) *Attorney, Agent, or Firm*—Staas & Halsey LLP

(57) ABSTRACT

An optical transmission system capable of monitoring the operating status of Raman-amplifier repeaters even when an optical transmission line is partly disrupted by a fiber failure. An end station sends a monitoring command signal to request a particular repeater to report its operating status, together with a response carrier wave for use in that reporting. With their different wavelengths, an upstream wavelength selector in the repeater selectively passes the monitoring command signal while reflecting back the response carrier wave. Responsive to the command, a monitoring controller creates a response message containing operating status information. An excitation unit performs Raman amplification with a pump beam modulated by a modulation controller, so that the response message be superimposed on the response carrier wave propagating on the upstream link. The resulting monitoring response signal is routed from the upstream wavelength selector to a downstream optical coupler and sent back to the requesting end station.

17 Claims, 24 Drawing Sheets

REFLECTION CHARACTERISTICS

OPTICAL TRANSMISSION SYSTEM

BACKGROUND OF THE INVENTION

1. Field of the Invention

The present invention relates to an optical transmission system, and more particularly to an optical transmission system with a function to locate a fault on an optical transmission line.

2. Description of the Related Art

The international telecommunication needs are rapidly growing in recent years, with the major driving forces being business globalization and Internet proliferation. In such circumstances, submarine optical transmission systems are expected to be as important as satellite communications systems, to meet the increasing demands for more cost-effective, bandwidth-rich telecommunication service.

In submarine optical transmission systems, in-line repeaters are placed at certain intervals along the fiber optic cable laid under the sea, so that the attenuation losses of signals will be compensated for by intermediary optical amplification. Such submarine systems are required to offer the highest level of reliability because a trouble in the undersea equipment would cost a lot of time and money to repair. For this reason, the system must have an integral troubleshooting mechanism that can pinpoint the fault in the event of such a failure.

To ensure that the optical transmission line is operating correctly, the monitoring system stimulates communication between end stations and repeaters. More specifically, an optical monitoring command signal is sent from an end station on the land to repeaters under the sea, so as to observe the operating status of each individual repeater. Upon receipt of such a command, the repeaters collect information about their own operating status and send the resultant response message back to the requesting end station.

Monitoring response signals are conveyed over the optical transmission line, being superimposed on main optical transmission signals. Conventional repeaters use an erbium-doped fiber amplifier (EDFA) to boost optical transmission signals with a pump beam generated by laser diodes, and they modulate the pump beam with their monitoring response signals to overlay the information on an optical transmission signal directed to the end station. Even when the incoming optical signal was lost due to a fiber failure or damage, EDFA-based repeaters could respond to monitoring command signals because they can send a response signal by modulating amplified spontaneous emission (ASE) waves produced from the EDF amplifier itself.

While EDFAs are commonly used in WDM systems, researchers have studied several other optical amplification techniques. Raman amplifier is one of the most recent and interesting developments in the field of optical communications, which is based on a nonlinear effect in optical fiber, known as the "Raman effect," that the wavelength of light changes when a light beam is deflected by vibrating molecules. Signal amplification occurs if optical pump waves with the correct wavelength and power are launched into the optical fiber, turning the full transmission length into an amplifying medium.

Such Raman amplification techniques can be applied to optical repeaters to realize a longer-distance, higher-capacity fiber-optic transmission system. As in the EDFA-based systems, repeaters with Raman amplifiers send monitoring response signals to report their operating status to an end station by modulating the pump laser diode output with a response message signal. The monitoring response signals are delivered to the requesting end station as a modulated component of the main optical transmission signals.

Repeaters using Raman amplification, however, would have a serious problem when a fiber failure or damage occurs at a point relatively close to them. As noted before, Raman amplifiers use fiber optic cables as the amplifying medium, meaning that a near-point fiber failure would detach that amplifying medium from the repeater. Since there is neither incoming optical transmission signals nor ASE being produced, the repeater has completely lost the vehicle for its monitoring response signals. The end station cannot monitor the repeaters.

SUMMARY OF THE INVENTION

In view of the foregoing, it is an object of the present invention to provide an optical transmission system which can monitor the operating status of Raman-amplifier repeaters effectively even when an optical transmission line is partly disrupted by a fiber failure or damage.

To accomplish the above object, according to the present invention, there is provided an optical transmission system which transports information over fiber-optic transmission lines of upstream and downstream links. This system comprises an end station and a repeater. The end station comprises the following elements: a monitoring signal transmitter which transmits over the upstream link a monitoring request signal including a monitoring command signal with a first optical wavelength and a response carrier wave with a second optical wavelength which is different from the first optical wavelength; and an operating status receiver which receives the monitoring response signal and identifies the operating status from the received monitoring response signal. The monitoring command signal requests a specified repeater to provide information about operating status thereof, and the response carrier wave is a carrier wave for the specified repeater to return the requested information as a monitoring response signal. The repeater, on the other hand, comprises the following elements: an upstream optical coupler, attached to the upstream link, which has a first port for splitting off a part of upstream transmission signals including the monitoring request signal sent from the end station and a second port for taking out an optical signal that enters the first port; an upstream wavelength selector, coupled to the first port of the upstream optical coupler, which selectively passes the first optical wavelength and reflects back the second optical wavelength, thereby extracting the monitoring command signal from the monitoring request signal received through the upstream optical coupler while reflecting the response carrier wave back to the first port; a monitoring controller, responsive to the monitoring command signal supplied from the upstream wavelength selector, which collects information about operating status of the repeater and encodes the collected information into a response message signal; an excitation unit which supplies a pump beam into the fiber-optic transmission line of the upstream link to perform optical amplification using the fiber-optic transmission line as an amplifying medium; a modulation controller, coupled to the excitation unit, which modulates the pump beam with the response message signal, whereby the response message signal is superimposed on the response carrier wave propagating on the upstream link and the resulting monitoring response signal reaches the upstream optical coupler; and a downstream optical coupler, attached to the downstream link, which has a port to accept the monitoring response signal from the second port of the upstream optical coupler and direct the monitoring response signal into the downstream link for delivery to the operating status receiving means in the end station.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
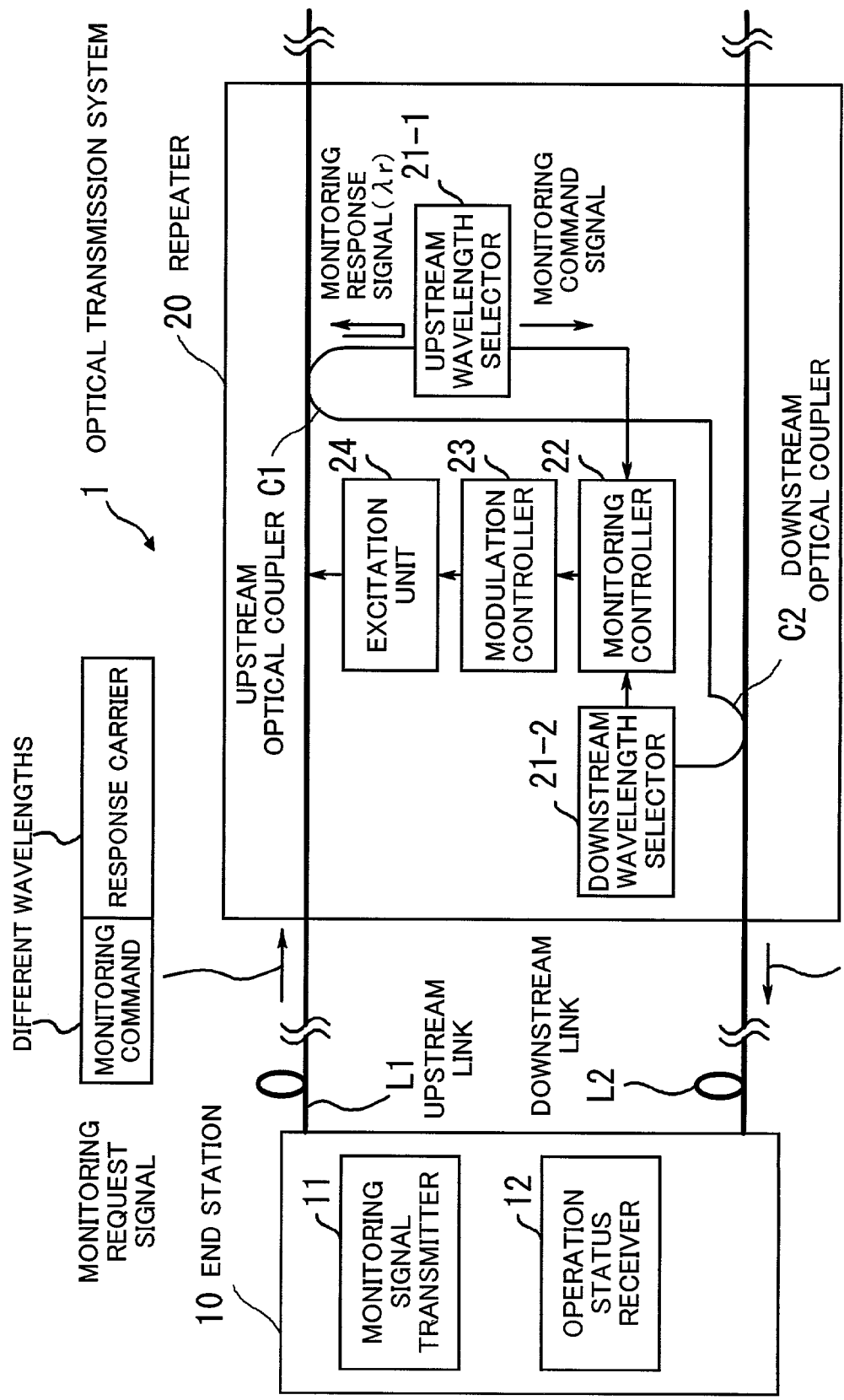
FIG. 1 is a conceptual view of an optical transmission system according to the present invention.

FIG. 1 is a conceptual view of an optical transmission system according to the present invention. While FIG. 1 shows only one end station 10 and one repeater 20 for simplicity, this long-haul optical transmission system 1 includes two end stations and a plurality of repeaters 20, with optical transmission links (fiber optic cables) connecting them in series. The system 1 has integral functions of monitoring the operating status of each repeater 20, making it suitable for terrestrial networks as well as for submarine networks. In undersea applications, the optical transmission lines and repeaters 20 are laid under the sea, while the end station 10 is located in a building on the land.

The end station 10 has a monitoring signal transmitter 11 and an operation status receiver 12. The monitoring signal transmitter 11 sends a monitoring request signal to the repeater 20 through the upstream link L1. The monitoring request signal includes a monitoring command signal followed by a response carrier wave. The monitoring command signal is an optical signal that requests a specified repeater 20 to report its own operating status. The response carrier wave is an optical carrier to be used when the specified repeater 20 responds to the monitoring command. That is, the monitoring result (or response message) will be superimposed on the response carrier wave for delivery to the requesting end station. The monitoring command signal has a first optical wavelength, and the response carrier wave has a second optical wavelength. The two wavelengths are different from each other. The symbol $\lambda r$ will be used in later sections to represent the second wavelength, i.e., the response carrier wavelength.

The operation status receiver 12 receives a monitoring response signal from the specified repeater 20 through the downstream link L2, thus recognizing the operation status of the repeater 20 of interest.

The repeater 20 has a status reporting function which is designed to work in response to monitoring request signals sent from both end stations. To this end, the repeater 20 has the following elements: an upstream optical coupler C1, a downstream optical coupler C2, an upstream wavelength selector 21-1, a downstream wavelength selector 21-2, a monitoring controller 22, a modulation controller 23, and an excitation unit 24.

The upstream optical coupler C1 is a 2×2 coupler attached to the upstream link L1. While passing upstream optical transmission signals, the coupler C1 has a first port to split off a part of the optical signals at a splitting ratio of, for example, 20:1 (i.e., one twentieth of optical power is transferred from the fiber optic cable to the first port). It also has a second port to lead an optical signal entering into the first port.

The two wavelength selectors 21-1 and 21-2 (collectively referred to by the reference numeral "21") accept signals branched from the upstream link L1 and downstream link L2, respectively. They receive a monitoring request signal split off at the optical coupler C1 or C2, passing the first optical wavelength to their output ports, but reflecting the second optical wavelength ($\lambda r$) back to its source. In this way, the wavelength selectors 21-1 and 21-2 selectively extract monitoring command signals with the first wavelength, while reflecting monitoring response signals with the second wavelength ($\lambda r$) which are produced by amplifying a response carrier wave with a modulated Raman excitation beam.

The monitoring controller 22 receives an incoming monitoring command signal through the upstream wavelength selector 21-1 (or downstream wavelength selector 21-2), converts it into an electrical signal, and extracts the signal content. Parsing the received monitoring command signal, the monitoring controller 22 compiles a response message from operating status information collected within the repeater 20. The information may include: the level of incoming and outgoing optical transmission signals, the driving current of pump laser diodes, and other conditions.

The excitation unit 24 injects a pumping beam into the fiber-optic transmission line to perform Raman amplification, which uses the fiber-optic cable as the amplifying medium. The modulation controller 23 modulates a pump light beam with the response message signal created by the monitoring controller 22, thereby superimposing the message on a response carrier wave ($\lambda r$) propagating over the upstream link L1. The resultant signal is referred to as the monitoring response signal.

The downstream optical coupler C2 is attached to the downstream link L2 to split off a part of downstream optical transmission signals therefrom and supply it to the downstream wavelength selector 21-2. It is also coupled to the upstream optical coupler C1 to redirect a monitoring response signal produced on the upstream link L1 into the downstream link L2 for delivery to the operation status receiver 12 of the requesting end station 10.

Figure 2:
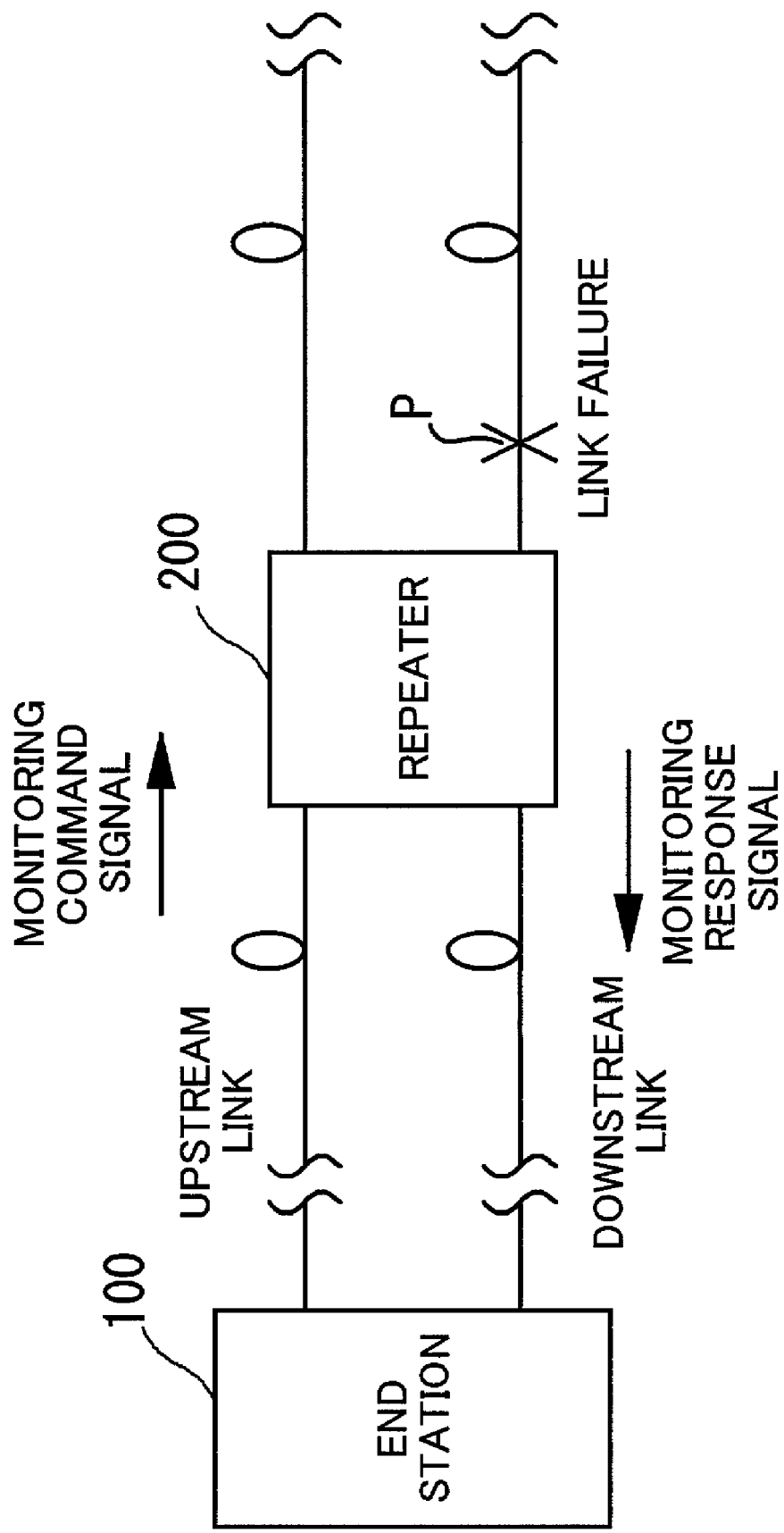
FIG. 2 shows what problem the present invention intends to solve.

Before moving into the detailed operation and signal processing of the above system, the next section first explain what kind of problems the present invention intends to solve. FIG. 2 shows an example of a problem situation, where an end station 100 on the left-hand side of FIG. 2 is attempting to monitor a remote repeater 200. The end station 100 sends a monitoring command signal to the repeater 200 via the upstream link, and the responding repeater 200 collects operating status information. The repeater 200 then sends a monitoring response signal back to the end station 100, superimposing a response message on the downstream main optical signals. Suppose here that the downstream fiber optic cable is broken or damaged at a point P immediately before the repeater 200, making it impossible for the repeater 200 to receive downstream optical transmission signals.

The above accident, however, would not affect the status monitoring functions of the end station 100 if the repeater 200 uses erbium-doped fibers as the amplifying media, and the EDFA is equipped with an automatic gain control circuit to regulate its own output signal level. That is, the EDFA would raise its gain when there was no incoming optical signals, and as a result, the EDFA produces a noise from itself, which is known as the amplified spontaneous emission (ASE). This optical noise can be modulated with response message, thus permitting the repeater 200 to send a monitoring response signal to the requesting end station 100.

The result would be completely different from the above if the repeater 200 uses distributed Raman amplifiers, instead of EDF amplifiers. Unlike EDFAs, Raman amplifiers require no special amplifying medium, but use intrinsic properties of ordinary silica fibers to obtain signal amplification. That is, in the system of FIG. 2, the fiber-optic cables extending from the repeater 200 can serve as a medium for amplification. The Raman amplification occurs when an appropriate pump beam produced by an excitation laser diode is sent into the transmission fiber conveying optical signals to be amplified. In normal situations, the repeater 200 modulates this pump wave with a response message in order to deliver a monitoring response signal to the end station 100. In problem situations shown in FIG. 2, however, the repeater 200 would be unable to respond to monitoring command signals from the end station 100, because the failure point P is so close to the repeater 200 that the remaining fiber length would no longer work as a Raman amplification medium. Without amplifying medium, no ASE would be produced. Now that both the downstream optical transmission signals or ASE waves are lost, the repeater 200 has no carrier waves to transport the response message, thus being unable to respond to monitoring command signals. (If the failure point P was a few tens of kilometers away from the repeater 200, the transmission fiber of that length would serve as a sufficient amplification medium, and thus the repeater 200 would be able to deliver its monitoring data over the resulting ASE waves.)

The present invention intends to solve the above drawback of Raman amplifier-based systems. This objective is accomplished by providing a mechanism to ensure the delivery of monitoring response signals to the end station 100 even if the optical transmission line is broken or damaged immediately before the repeater 200. With this improved monitoring function, the optical transmission system will be able to offer a higher degree of reliability and service quality.

Figure 3:
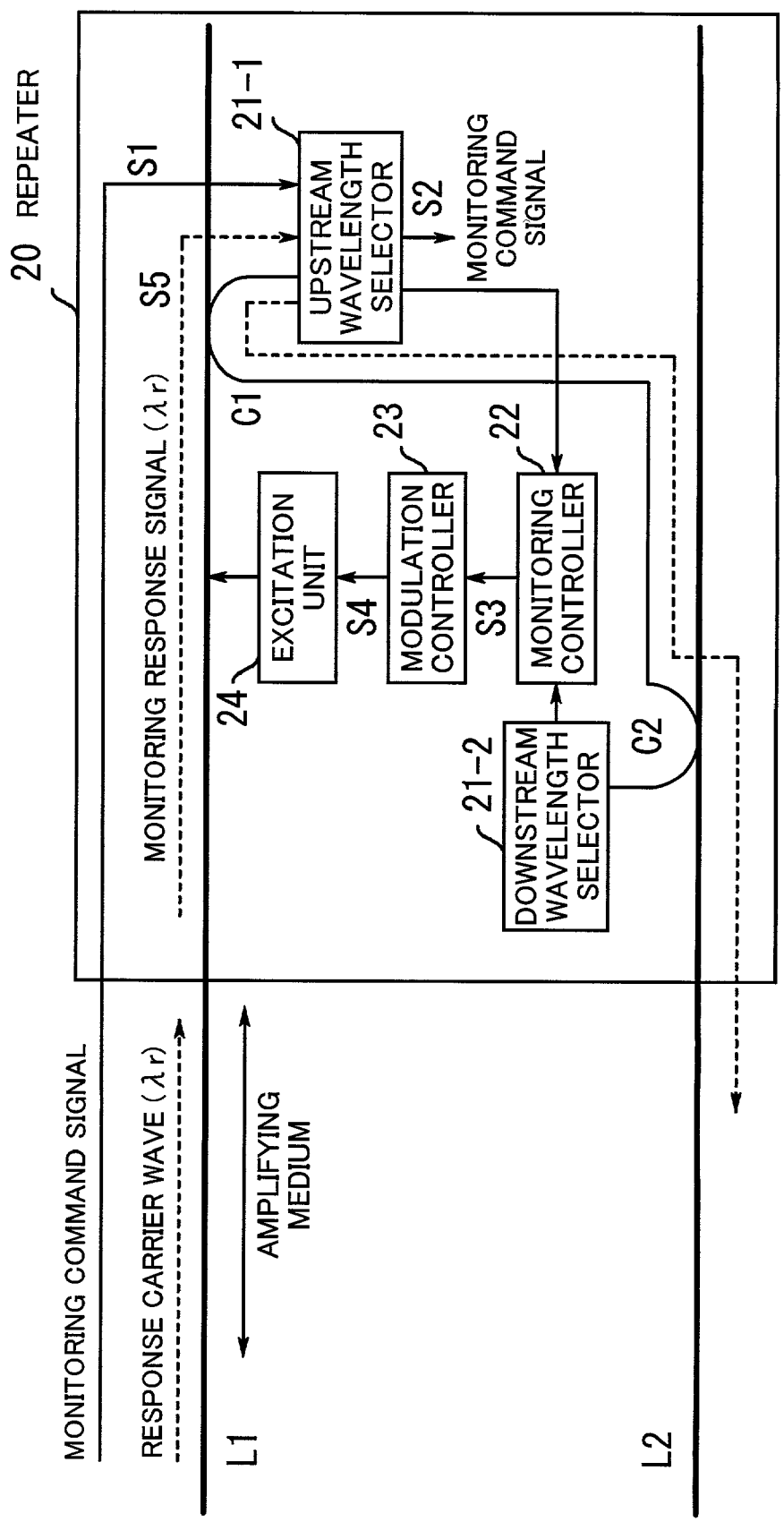
FIG. 3 explains a monitoring process and related signal flow.

Referring now to FIG. 3, the total operation and signal flow of the present invention is explained. While FIG. 3 illustrates only a repeater 20, it is assumed that a monitoring request signal is received from an end station 10 (not shown) located at the left of the repeater 20, as described earlier in FIG. 1. The illustrated repeater 20 performs a status monitoring process according to the following signal flow:

(S1) The end station 10 places a monitoring request signal on the upstream link L1. The monitoring command signal, addressed to the repeater 20, propagates over the upstream link L1 and reaches the upstream optical coupler C1. The monitoring command signal is then split off at the upstream optical coupler C1 and directed to the inside of the repeater 20.

(S2) The wavelength selector 21-1 selectively feeds the received monitoring command signal to the monitoring controller 22.

(S3) Recognizing the specified address of the monitoring command signal as its own, the monitoring controller 22 begins collecting information about the current operating status of the repeater 20 itself. A response message signal is then created from the collected information.

(S4) The modulation controller 23 controls the excitation unit 24 so that the Raman pump light will be modulated with the response message signal. The modulated pump light amplifies a response carrier wave propagating over the upstream link L1. Accordingly, the response message signal is overlaid on the response carrier wave, thus yielding a monitoring response signal.

(S5) The produced monitoring response signal is split off at the upstream optical coupler C1, entered into the repeater 20, and reflected at the upstream wavelength selector 21-1. The reflected monitoring response signal goes through the optical couplers C1 and C2, joins the downstream signals, and travels over the downstream link L2 until it reaches the end station 10

The above explanation has assumed that the repeater 20 receives a monitoring request signal from its left-hand side of FIG. 3. Actually, the repeater 20 can respond to monitoring request signals coming from the opposite side through the downstream link L2, because it has a symmetric structure to allow both end stations to initiate monitoring operations.

As described above, the proposed optical transmission system 1 is configured to send a monitoring request signal from an end station 10 to receive operating status information from an intended repeater 20. The monitoring request signal includes a response carrier wave in addition to a monitoring command signal, which allows the repeater 20 with Raman amplifiers to produce a monitoring response signal by superimposing its response message on the received response carrier wave for delivery to the end station 10. This structural arrangement ensures the provision of a carrier wave for the repeater 20 to return a response message even in such a problem situation where a near-end fiber failure has disrupted the propagation of optical transmission signals or ASE on the downstream link.

Figure 4:
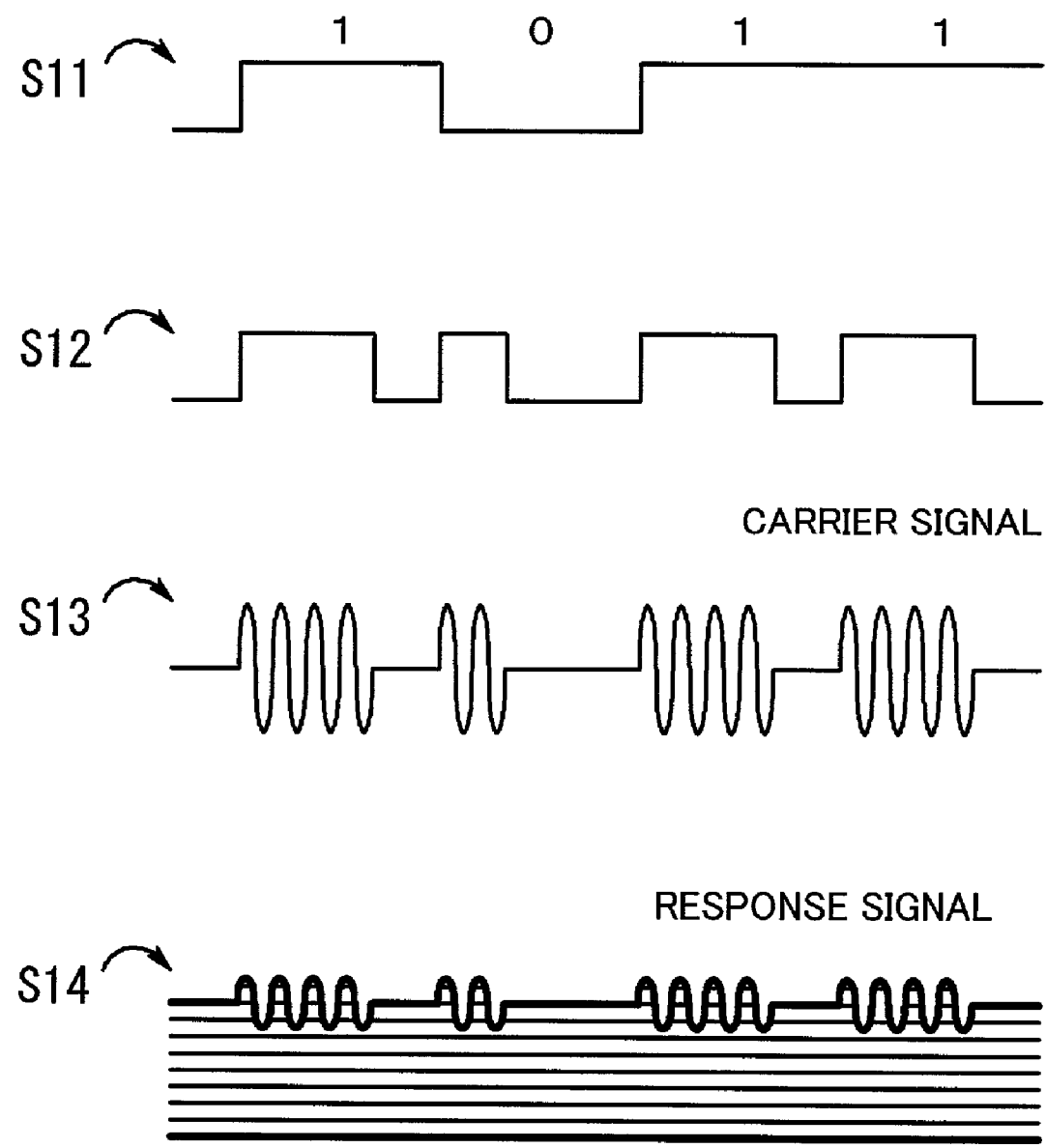
FIG. 4 shows an example method of producing a monitoring response signal.

Referring next to FIG. 4, a process of making a monitoring response signal is explained. This example process comprises the following steps:

(S11) The modulation controller 23 converts observed analog values into digital signals to send them as a response message.

(S12) The modulation controller 23 converts the resultant digital response message into a pulse train by encoding 1s to wide pulses and 0s to narrow pulses.

(S13) From that pulse train, the modulation controller 23 produces a carrier signal shown in the third waveform of FIG. 4. It then applies gain modulation (amplitude modulation) on the response carrier wave with the above carrier signal. More specifically, the modulation controller 23 modulates the driving current of a pump laser diode with the carrier signal.

(S14) The excitation unit 24 performs Raman amplification using the pump beam modulated at step S13. This step superimposes the response message on the response carrier wave thus producing a monitoring response signal.

Figure 5:
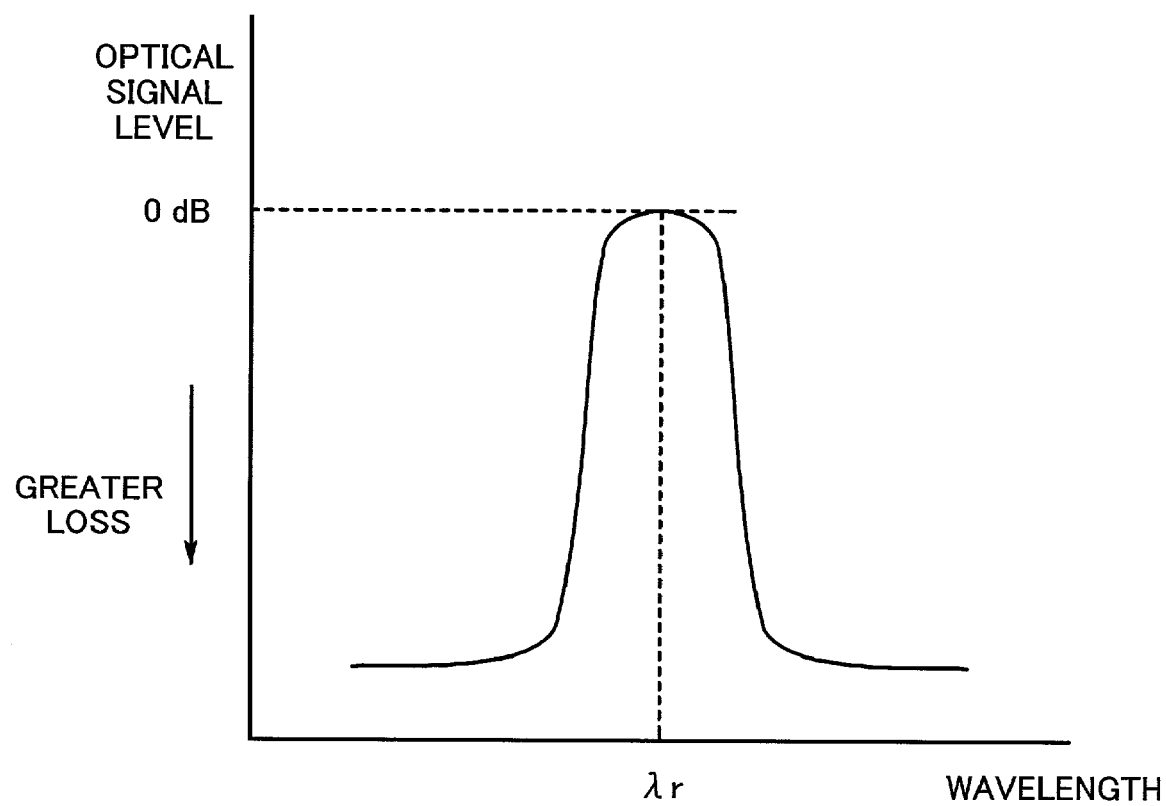
FIGS. 5 and 6 show the reflection characteristics and transmission characteristics of a wavelength selector.

The next section will now describe the characteristics of the wavelength selectors 21. FIG. 5 shows the reflection, and FIG. 6 shows the transmission, both of which are plotted with optical signal level on the vertical axis and wavelength on the horizontal axis.

Referring first to the reflection characteristics of FIG. 5, the wavelength selectors 21 exhibits no loss (0 dB) at a particular wavelength of $\lambda r$ and large losses at the other wavelengths. This means that the wavelength selectors 21 reflect response carrier waves, while allowing signals with other wavelengths to pass through.

Figure 6:
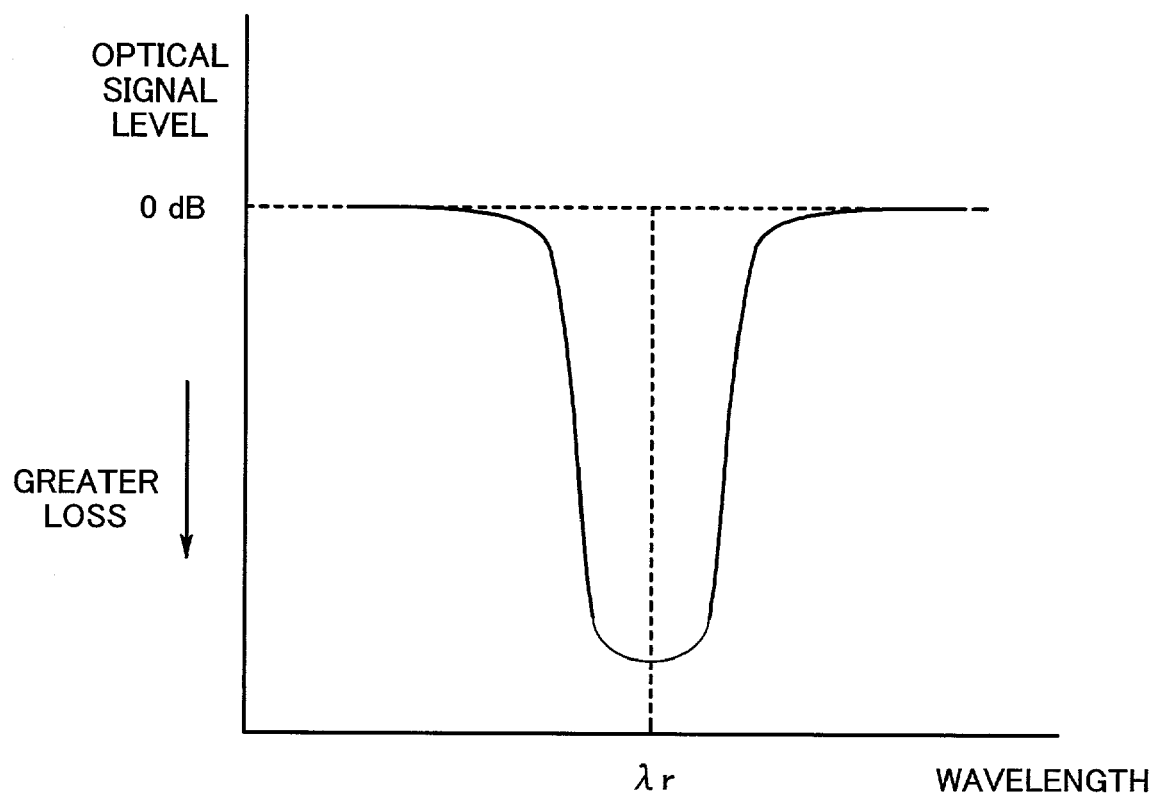

Referring next to the transmission characteristics of FIG. 6, the wavelength selectors 21 exhibits a peak loss at the wavelength $\lambda r$ while showing no loss (0 dB) for other wavelengths. This also means that the wavelength selectors 21 reflect response carrier waves, while allowing signals with other wavelengths to pass through.

Figure 8:
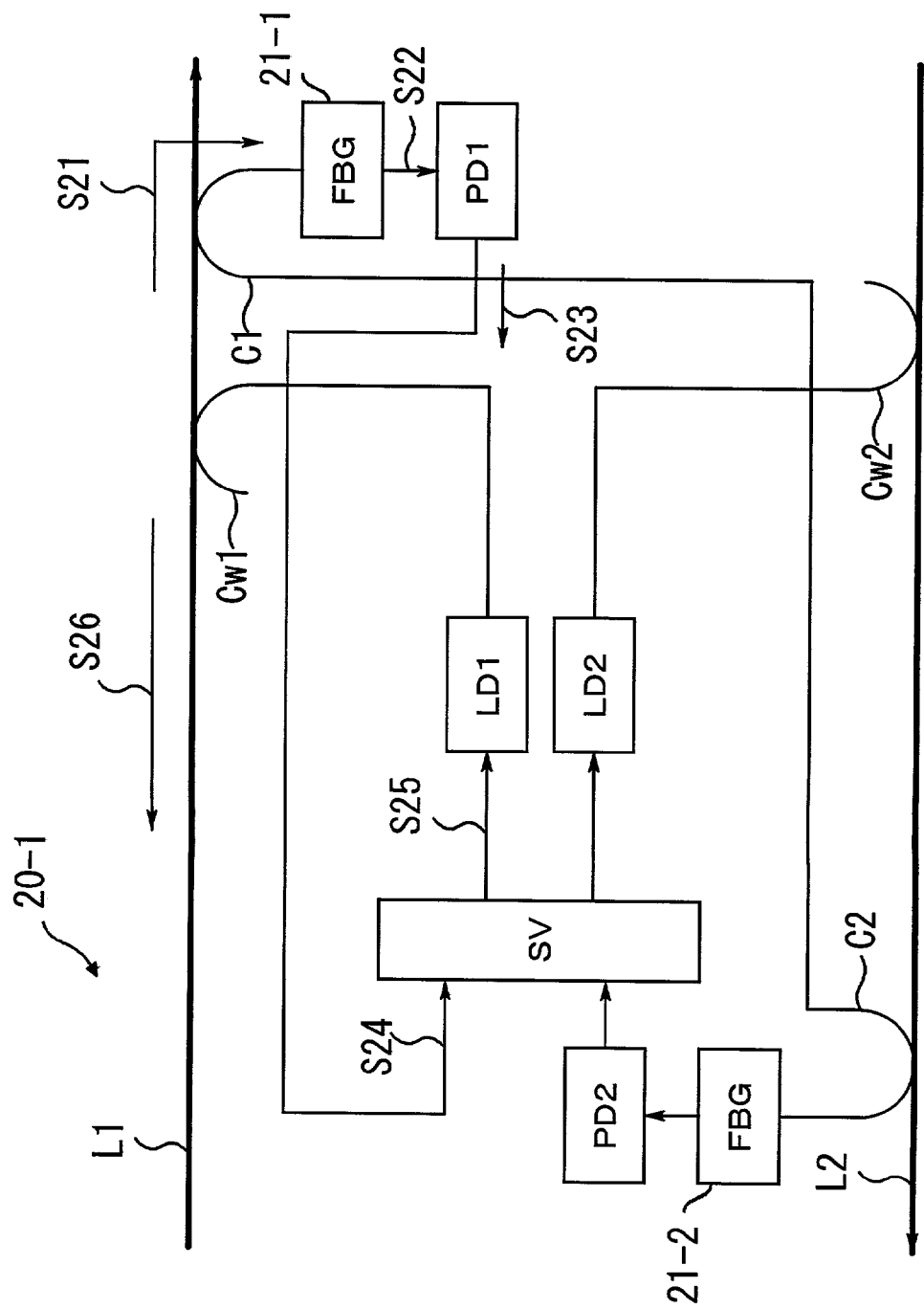
FIG. 8 is a block diagram of a first embodiment of the present invention.

As described above, the wavelength selectors 21 need a wavelength-specific property; i.e., they selectively reflect a particular optical wavelength. Such a wavelength selector 21 may be implemented as an in-line fiber device like fiber Bragg gratings. A fiber Bragg grating (FBG) is a small section of optical fiber that is modified to create periodic changes in the refraction index. Depending on the space between the changes, a certain wavelength of light is reflected back, while all other wavelengths pass through. FIG. 8 and later figures will include FBGs in place of the wavelength selectors 21.

Figure 7A:
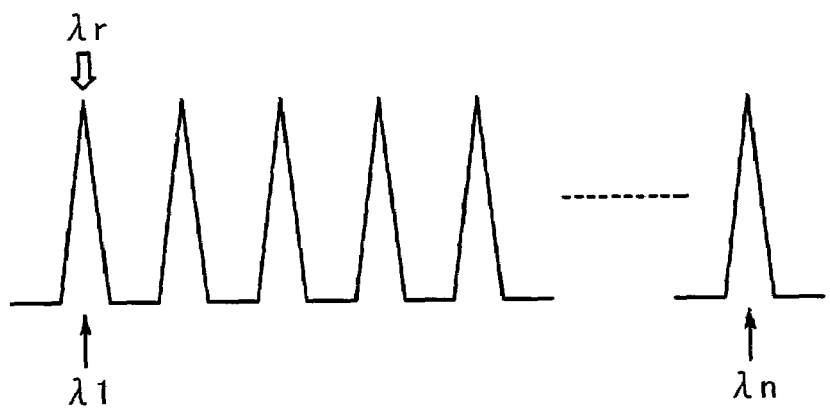
FIG. 7(A) shows a frequency spectrum in which the shortest wavelength is allocated to response carrier waves.
Figure 7B:
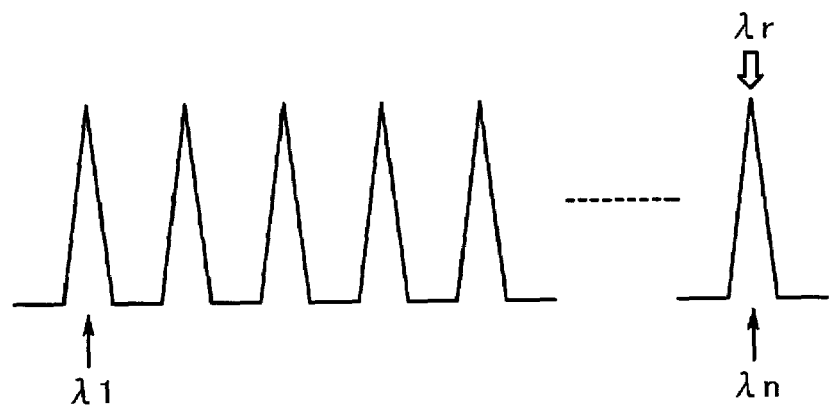
FIG. 7(B) shows a frequency spectrum in which the longest wavelength is allocated to response carrier waves.
Figure 7C:
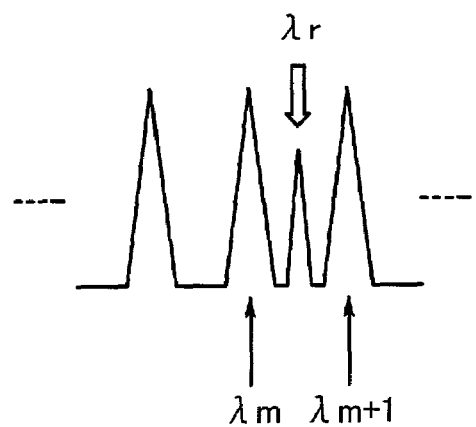
FIG. 7(C) shows a frequency spectrum in which a response carrier wave is inserted between two consecutive wavelengths $\lambda m$ and $\lambda m+1$.

The optical transmission system 1 transports a plurality of optical transmission signals, combining them on a single fiber medium with wavelength division multiplexing (WDM) techniques. The monitoring signal transmitter 11 sends a response carrier wave with an appropriate wavelength $\lambda r$ that is allocated within the WDM spectrum. Referring now to FIGS. 7(A) to 7(C), three different $\lambda r$ allocation patterns are shown. FIG. 7(A) shows a first setup in which the shortest wavelength $\lambda 1$ is assigned as a response carrier wave $\lambda r$. FIG. 7(B) shows a second setup in which the longest wavelength $\lambda n$ is used as a response carrier wave $\lambda r$. FIG. 7(C) shows a third setup in which a response carrier wave $\lambda r$ is inserted between two consecutive wavelength channels $\lambda m$ and $\lambda m+1$, where $1<m<n$.

Referring next to FIG. 8 to FIG. 24, nine different embodiments of the present invention will be discussed. Note that, in all of those embodiments, the proposed repeater 20 is implemented with a symmetrical structure to support bidirectional monitoring operations.

FIG. 8 is a block diagram of a first embodiment of the present invention. The illustrated repeater 20-1 has the following elements: FBGs 21-1 and 21-2, photodiodes PD1 and PD2, laser diodes LD1 and LD2, a supervisory circuit (SV), optical couplers C1 and C2, and WDM couplers Cw1 and Cw2. It is assumed in FIG. 8 that an end station 10 (not shown) is located on the left of the repeater 20-1. When a monitoring request signal is received from the end station 10, this repeater 20-1 operates as follows:

(S21) The optical monitoring request signal is split off at the upstream optical coupler C1 and directed to the inside of the repeater 20-1.

(S22) The FBG 21-1 allows the monitoring command signal to pass through to the upstream photodiode PD1.

(S23) The upstream photodiode PD1 transduces the optical monitoring request signal into an electric signal for delivery to the supervisory circuit SV.

(S24) The supervisory circuit SV recognizes the received signal as a monitoring command signal addressed to itself, and then begins collecting information about the current operating status of the repeater 20-1. It creates a response message signal from the collected information.

(S25) The supervisory circuit SV modulates the driving current of the laser diode LD1 with the response message signal.

(S26) Through the WDM coupler Cw1, the pump beam radiated from the laser diode LD1 is supplied to the upstream fiber cable in the backward direction. This pump beam is coupled with a response carrier wave coming over the upstream link L1, making Raman amplification happen. Since the pump beam is modulated at step S25, the optical amplification over the upstream optical fiber medium results in a superimposed response message signal on the response carrier wave. The resulting monitoring response signal is then branched through the upstream optical coupler C1 and then reflected back at the upstream FBG 21-1. Passing through the first optical coupler C1, the reflected signal is directed to the downstream link L2 via the downstream optical coupler C2. The monitoring response signal propagates on the downstream link L2 toward the requesting end station 10.

Figure 9:
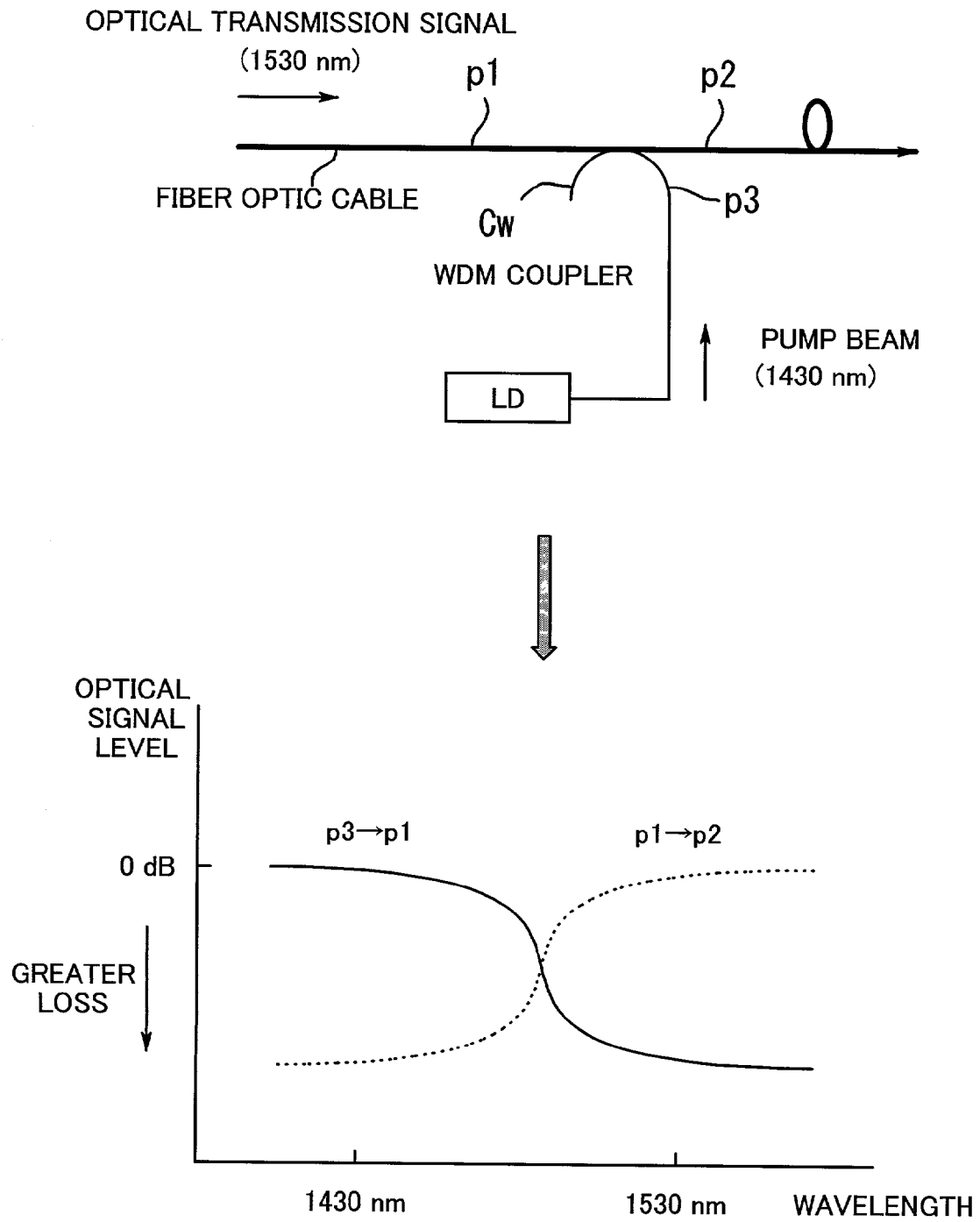
FIG. 9 shows a typical characteristic of WDM couplers.

FIG. 9 explains a typical characteristic of the WDM couplers Cw1 and Cw2 (collectively referred to by the reference symbol "Cw"). The upper half of FIG. 9 shows a WDM coupler Cw which is placed on an optical transmission line to inject a pump beam into the fiber optic medium. While the multiplexed optical transmission signals have wavelengths ranging from 1530 nm to 1560 nm, only the nominal wavelength 1530 nm is shown in FIG. 9. The laser diode LD is designed to emit a pumping light with a wavelength that is typically 100 nm shorter than the wavelength of optical signals to be amplified (hence, the pump beam of 1430 nm in the example of FIG. 9).

The lower half of FIG. 9 shows the optical characteristics of the WDM coupler Cw, where the solid line represents the transmission from port p3 to port p1, and the dotted line represents that from port p1 to port p2. The p1-to-p2 transmission characteristic tells us that the WDM coupler Cw gives the largest losses at about 1430 nm, but almost no losses (0 dB) at 1530 nm and above. This means that the optical transmission signals with the nominal wavelength of 1530 nm can propagate from port P1 to port P2 of the WDM coupler Cw without losses.

In contrast to the above, the p3-to-p1 transmission characteristic tells us that the WDM coupler Cw gives the largest losses at about 1530 nm, but almost no losses (0 dB) at 1430 nm and above. That is, the 1430-nm pump light beam passes through the WDM coupler Cw, from port p3 to port p1, thereby exciting the fiber transmission medium in an opposite direction to the main signal propagation. This scheme is referred to as the backward-pumped Raman amplification.

Figure 10:
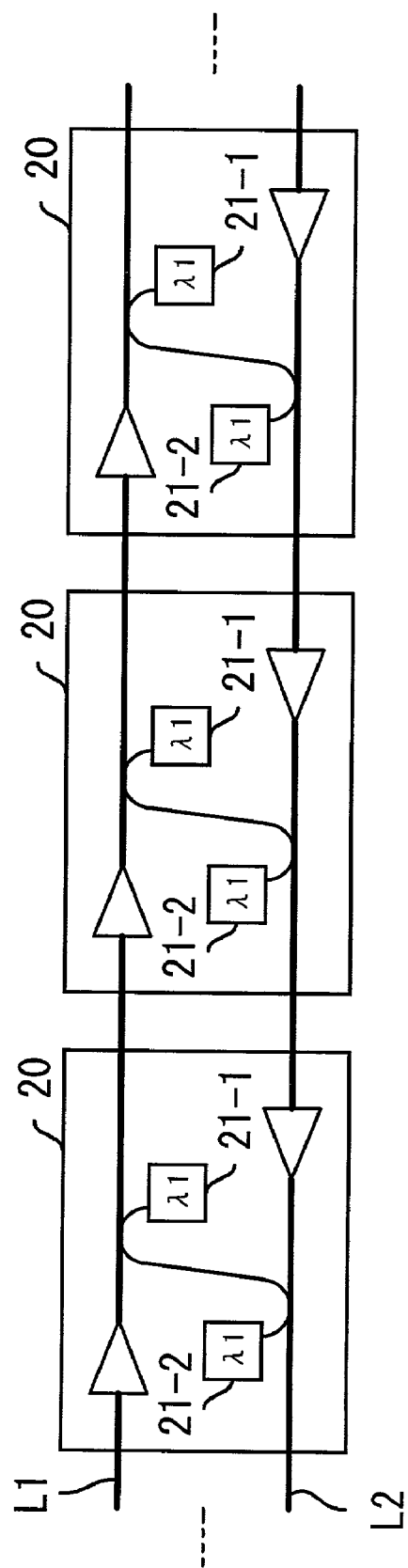
FIG. 10 shows an example of a reflecting wavelength combination.
Figure 11:
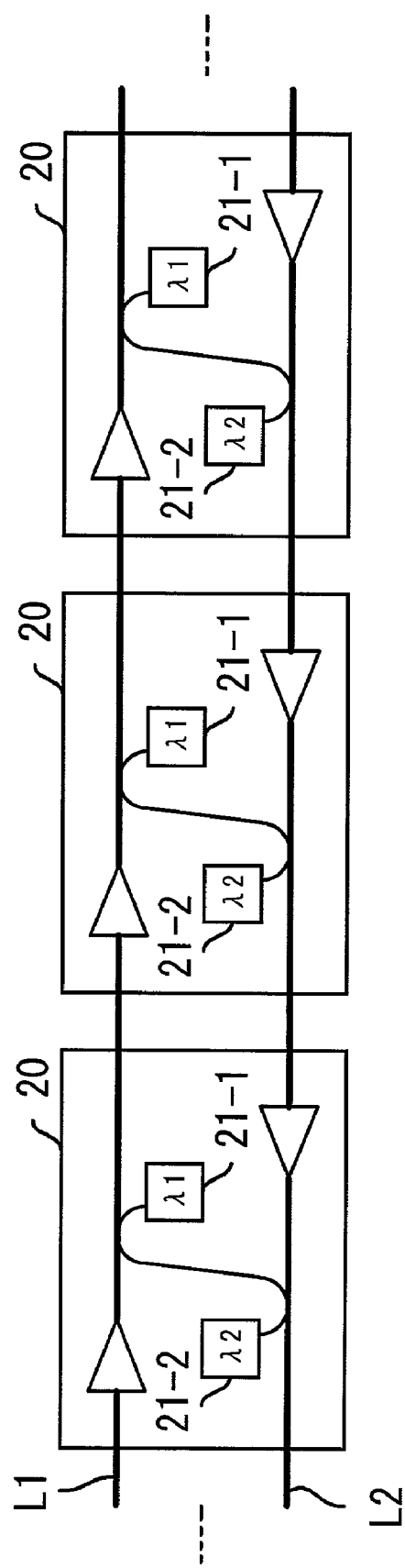
FIG. 11 shows another example of a reflecting wavelength combination.
Figure 12:
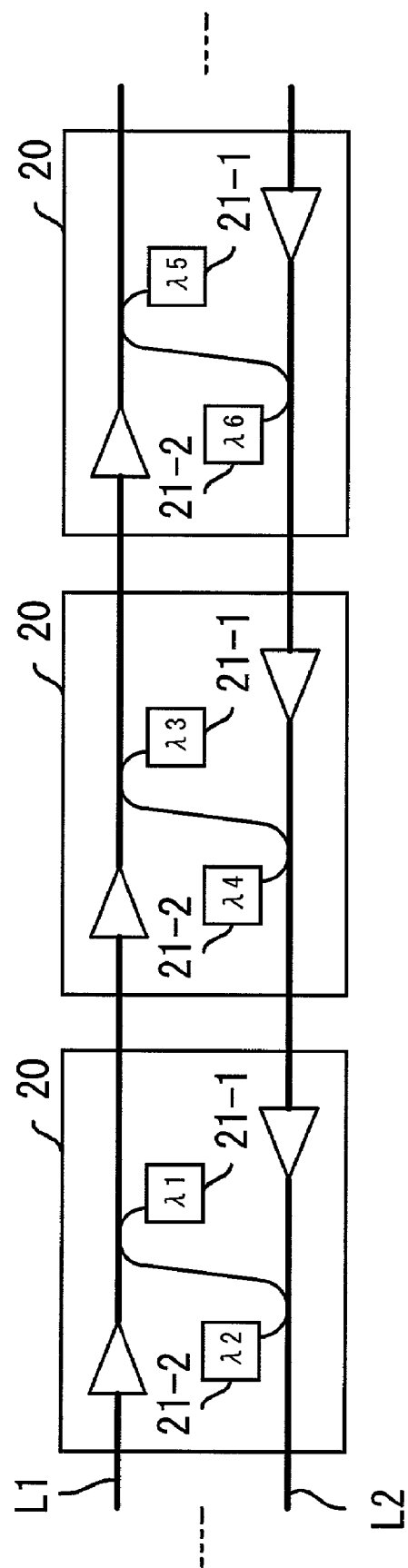
FIG. 12 shows yet another example of a reflecting wavelength combination.

Referring now to FIGS. 10 to 12, several possible configurations of FBGs will be discussed. According to the present invention, every repeater 20 is equipped with two FBGs 21-1 and 21-2 each having a particular wavelength to reflect back. When building an optical transmission system, designers face a question of using the same wavelength for all repeaters (FIG. 10), or different wavelengths for upstream and downstream links (FIG. 11), or uniquely different wavelengths for individual FBGs (FIG. 12).

FIG. 10 shows a system in which all repeaters 20 use the same wavelength λ1 for their FBGs 21-1 and 21-2. This unified wavelength assignment permits the designer to use only one type of FBG throughout the system.

FIG. 11 shows another system in which all repeaters 20 have the same configuration, but the wavelength λ1 of the upstream FBG 21-1 is different from the wavelength λ2 of the downstream FBG 21-2. This configuration prevents multiple reflections from happening between two FBGs 21-1 and 21-2.

FIG. 12 shows still another system in which all FBGs have unique reflecting wavelengths (λ1, λ2, λ3, and so on). This configuration perfectly prevents any combinations of FBGs from causing multiple reflections.

Figure 13:
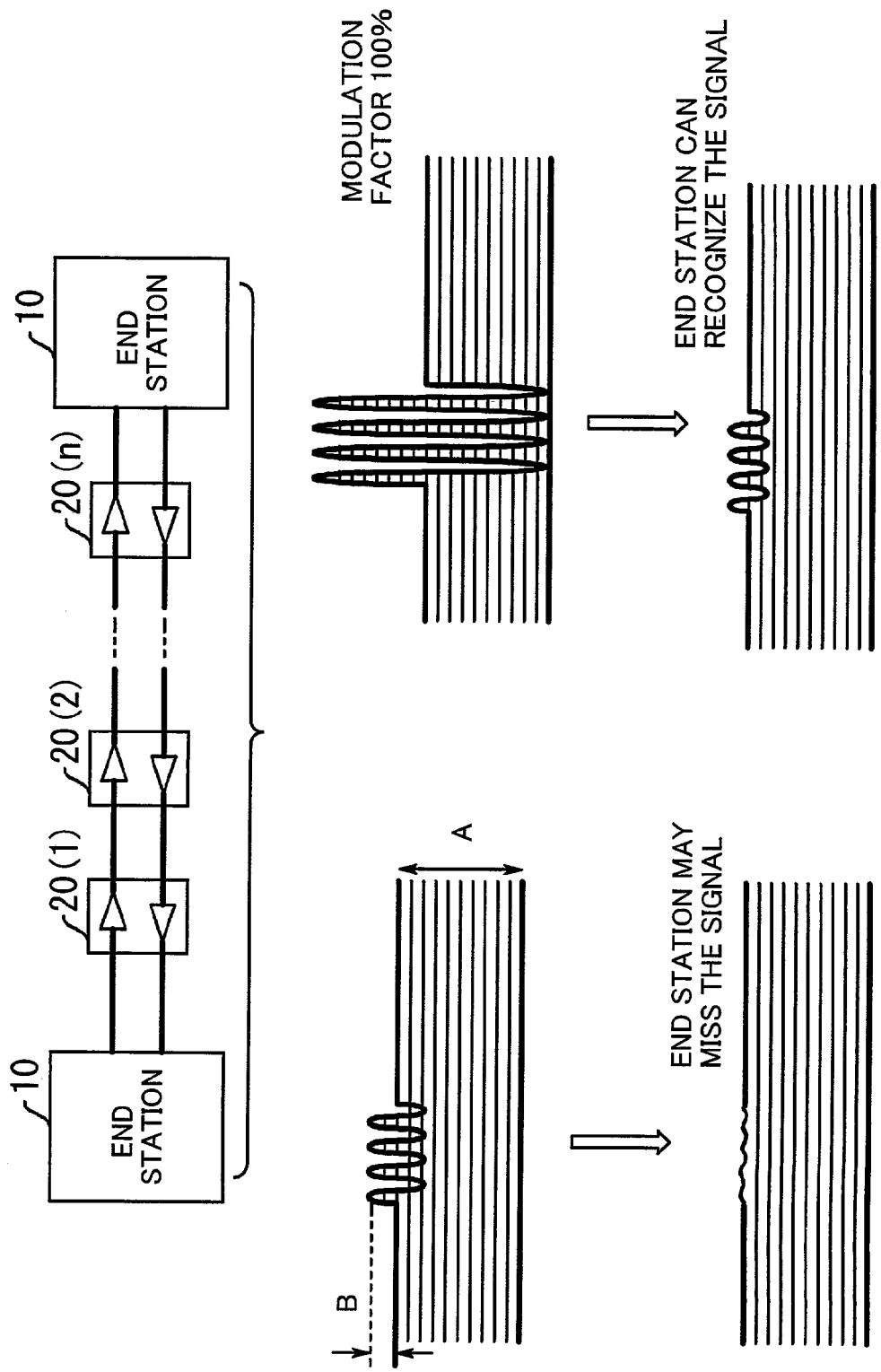
FIG. 13 shows a modulation factor given by a modulation controller.

Referring next to FIG. 13, the modulation factor of the modulation controller 23 will be explained. Suppose that an amplitude-modulated monitoring response signal is transmitted from one of the repeaters 20(1) to 20(n) to one of the end stations 10 that is requesting operating status information. As mentioned earlier in FIG. 10, all FBGs may have the same reflecting wavelength. If this is the case, the monitoring response signal arriving at the end station 10 would be too weak for the receiving end station 10 to recognize because of its decreased modulation factor. Here, the modulation factor is defined to be (B/A)×100 in percent, where A is the amplitude of a response carrier signal, and B is the peak amplitude of a modulating signal.

To ensure the reception of amplitude-modulated signals, the requested repeater 20 produces a monitoring response signal with the maximum modulation factor when the transmission line is in an out-of-service state where there is no information to send. This maximum modulation factor increases signal margin, thus enabling the monitoring response signal to overcome the attenuation before reaching the requesting end station 10.

Figure 14:
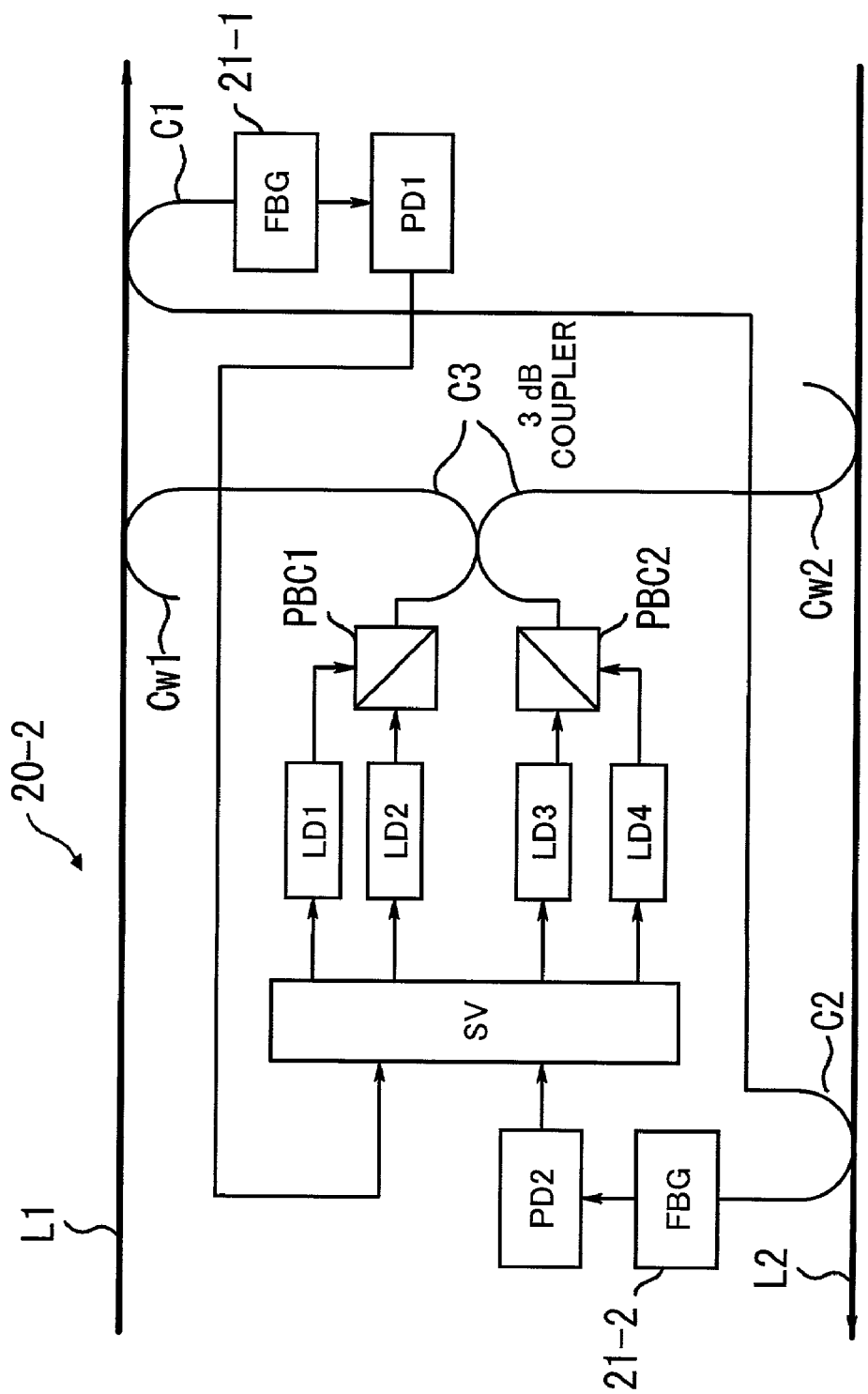
FIG. 14 is a block diagram of a second embodiment of the present invention.

FIG. 14 is a block diagram of a repeater 20-2 according to a second embodiment of the present invention. In addition to the elements of the first embodiment of FIG. 8, this second embodiment has two more laser diodes LD3 and LD4, two polarization beam couplers PBC1 and PBC2, and a 3-dB coupler C3. The four laser diodes LD1 to LD4 constitute a redundant configuration which provides an increased optical power, besides making the system tolerant of laser diode failures.

More specifically, the first polarization beam coupler PBC1 combines pump beams produced by the first pair of laser diodes LD1 and LD2, while the second polarization beam coupler PBC2 combines those produced by the second pair of laser diodes LD3 and LD4. The 3-dB coupler C3 feeds those combined beams from PBC1 and PBC2 to the upstream link L1 and downstream link L2 at the ratio of 1:1. The output beams are supplied to the fiber-optic cables through upstream and downstream WDM couplers Cw1 and Cw2 to stimulate Raman amplification. In monitoring operation, the supervisory unit modulates those pump beams to produce monitoring response signals.

Figure 15:
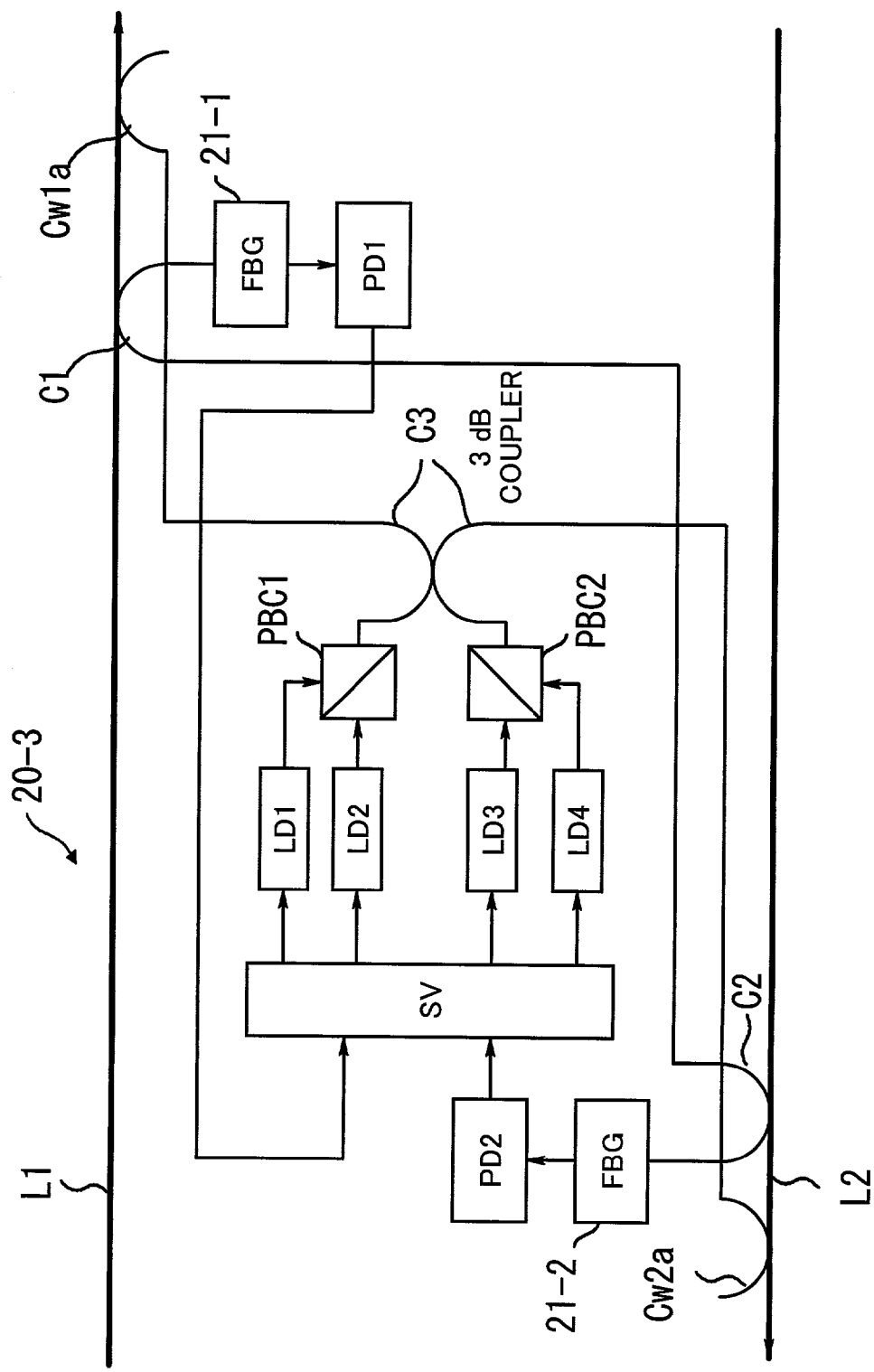
FIG. 15 is a block diagram of a third embodiment of the present invention.

FIG. 15 is a block diagram of a repeater 20-3 according to a third embodiment of the present invention. This repeater 20-3 is different from the second embodiment of FIG. 14 in that the WDM couplers Cw1 Cw2 are reversed. That is, as FIG. 15 shows, the WDM couplers Cw1a and Cw2a are attached to the upstream and downstream links L1 and L2 to input pump beams in the same direction as the optical transmission signal propagates. This pumping scheme is known as the forward-pumped Raman amplification. Other circuit configuration and operation are similar to what was described in the second embodiment of FIG. 14.

Figure 16:
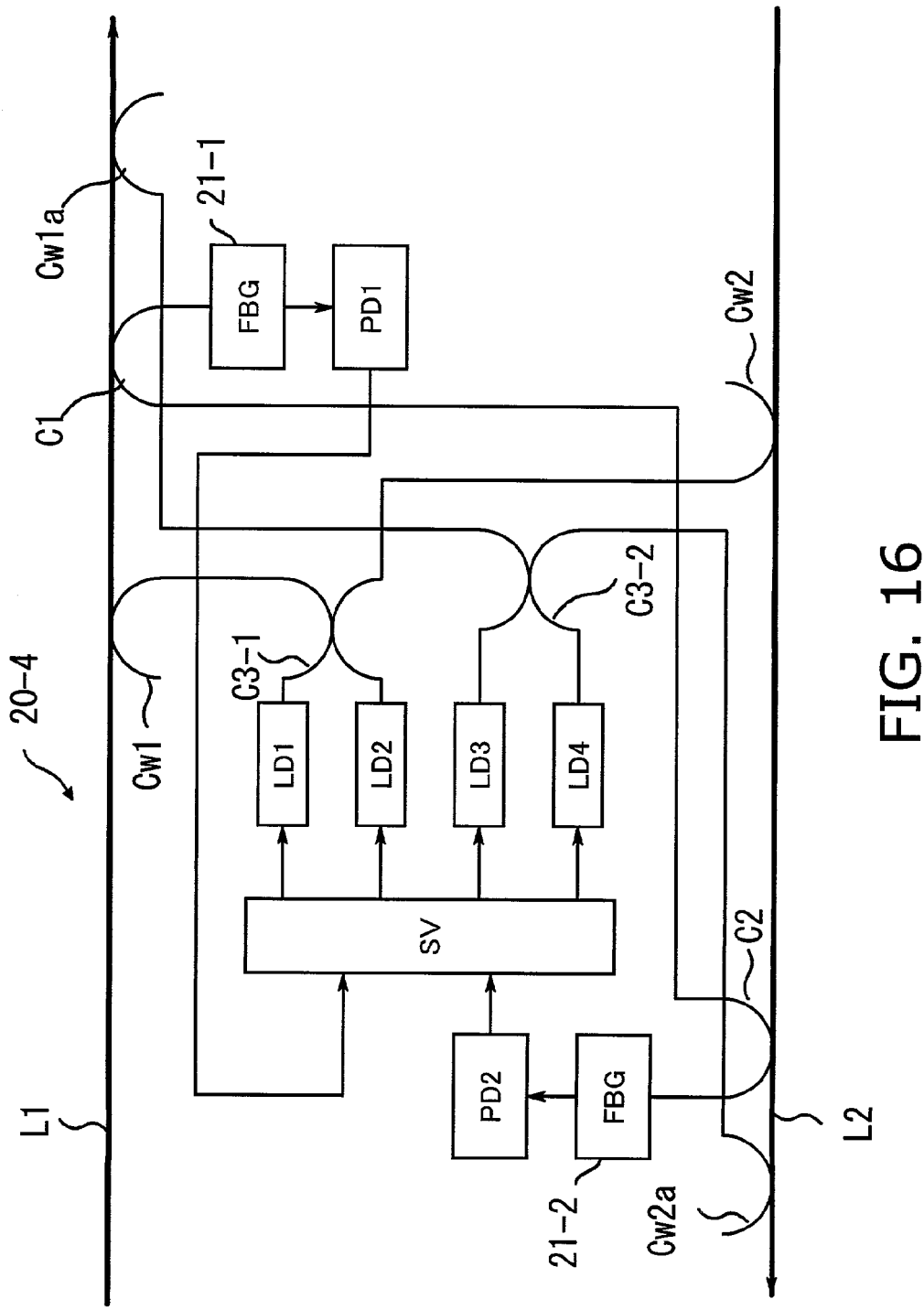
FIG. 16 is a block diagram of a fourth embodiment of the present invention.

FIG. 16 is a block diagram of a repeater 20-4 according to a fourth embodiment of the present invention. This repeater 20-4 differs from the preceding ones in its use of 3-dB couplers C3-1 and C3-2. The first 3-dB coupler C3-1 distributes pump beams from laser diodes LD1 and LD2 to the upstream link L1 and downstream link L2 in their respective backward directions through WDM couplers Cw1 and Cw2. Likewise, the second 3-dB coupler C3-2 distributes pump beams from laser diodes LD3 and LD4 to the upstream link L1 and downstream link L2 in their respective forward directions through WDM couplers Cw1a and Cw2a. This means that the illustrated repeater 20-4 pumps both forward and backward, thus performing two-way-pumped Raman amplification.

Figure 17:
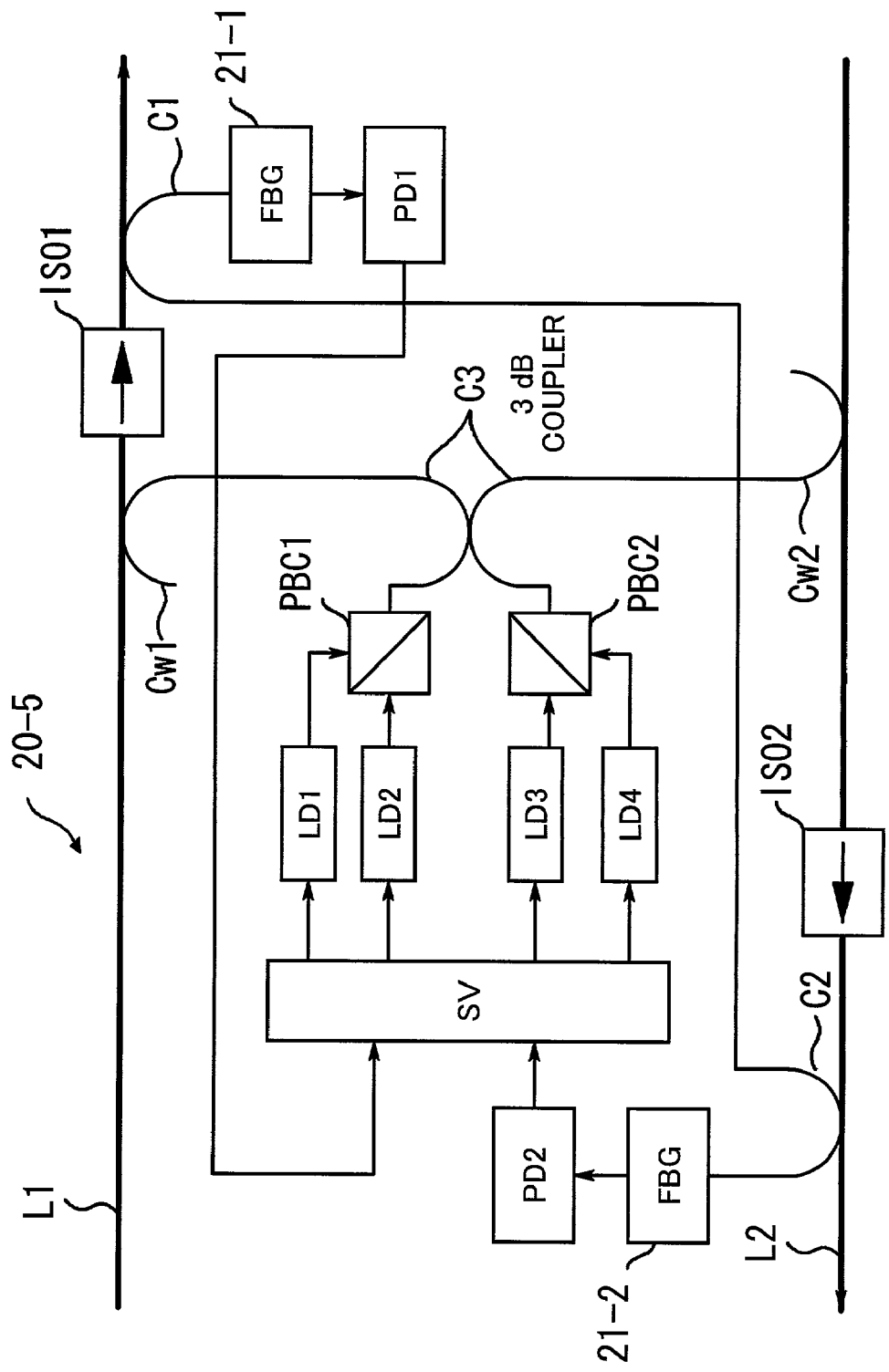
FIG. 17 is a block diagram of a fifth embodiment of the present invention.

FIG. 17 is a block diagram of a repeater 20-5 according to a fifth embodiment of the present invention. This repeater 20-5 differs from the preceding ones in its use of directional isolators. One isolator ISO1 is placed between the WDM coupler Cw1 and optical coupler C1 on the upstream link L1. Another isolator ISO2 is placed between the WDM coupler Cw2 and optical coupler C2 on the downstream link L2. These upstream and downstream isolators ISO1 and ISO2 prevent optical signals from propagating in unintended directions, thus suppressing multiple-reflection degradation. This feature of the illustrated repeater 20-5 ensures stable operation of optical amplifiers.

Figure 18:
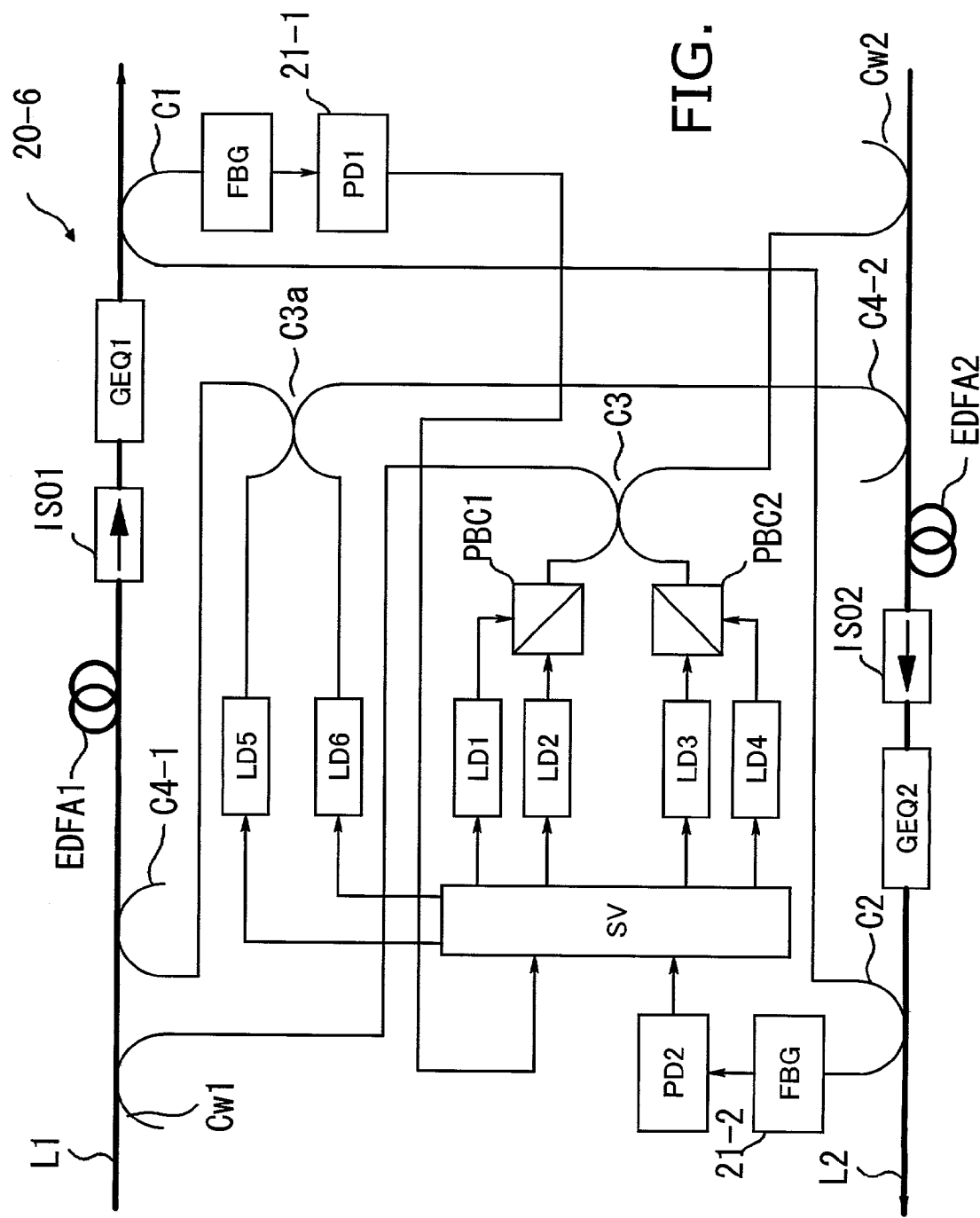
FIG. 18 is a block diagram of a sixth embodiment of the present invention.

FIG. 18 is a block diagram of a repeater 20-6 according to a sixth embodiment of the present invention. This repeater 20-6 differs from the preceding embodiments in that it employs a hybrid (EDF and Raman) amplification system. That is, the repeater 20-6 has an EDF amplifier EDFA1 and a gain equalizer GEQ1 on the upstream link L1, and another EDF amplifier EDFA2 and another gain equalizer GEQ2 on the downstream link L2. To energize the two EDF amplifying media EDFA1 and EDFA2, the repeater 20-6 has two additional laser diodes LD5 and LD6. The pump beams produced by the laser diodes LD5 and LD6 are split into two beams at an optical coupler C3a and supplied to the upstream and downstream links L1 and L2 through their corresponding optical couplers C4-1 and C4-2, respectively. These beams energize the erbium-doped fibers EDFA1 and EDFA2, thus amplifying optical signals propagating on the links L1 and L2.

Figure 19:
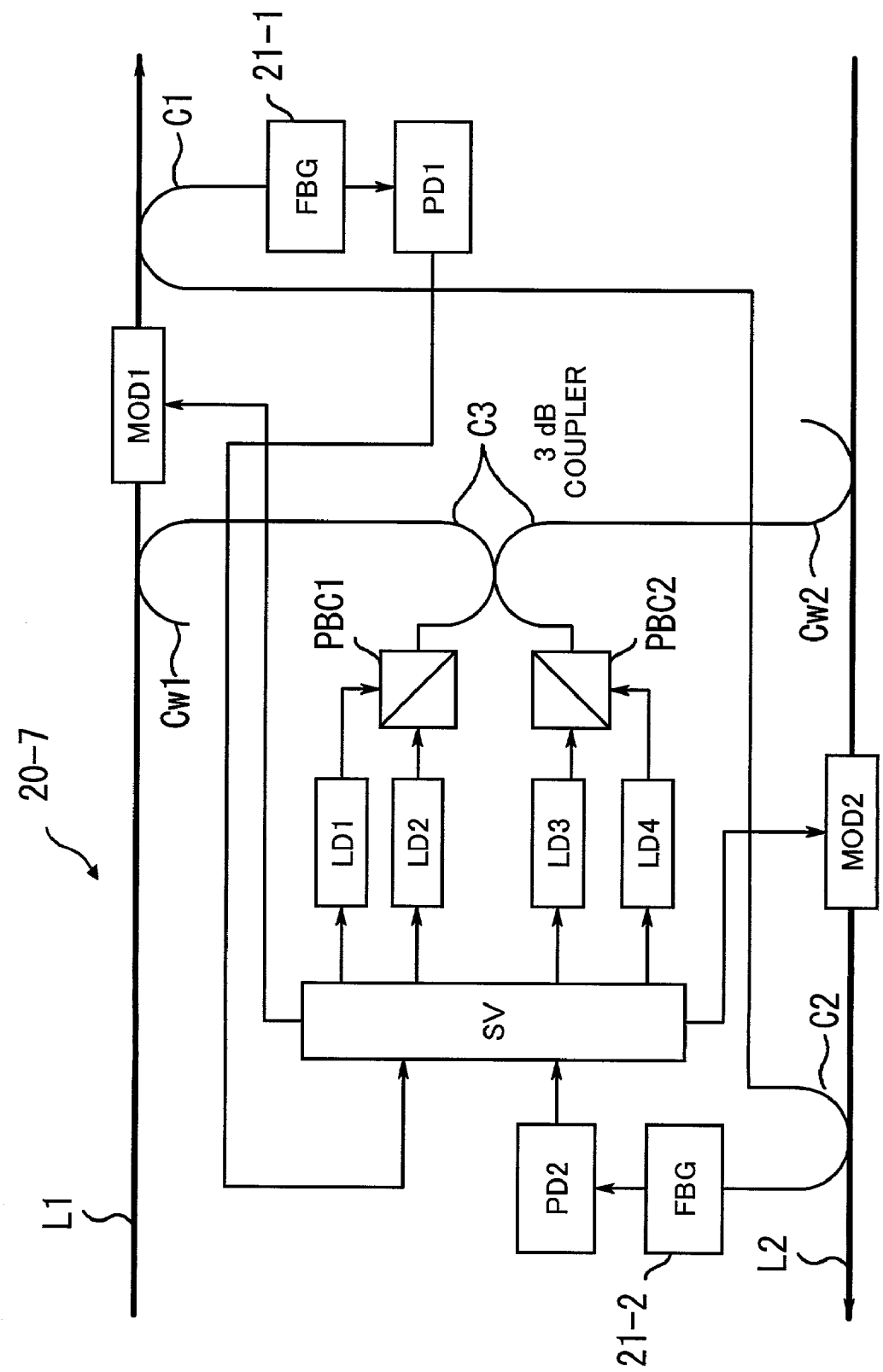
FIG. 19 is a block diagram of a seventh embodiment of the present invention.

FIG. 19 is a block diagram of a repeater 20-7 according to a seventh embodiment of the present invention. This repeater 20-7 is distinguishable from the preceding ones in that two optical modulators MOD1 and MOD2 are placed on the upstream and downstream links L1 and L2 to produce monitoring response signals. These two modulators produces the same end effect as what the modulation controller 23 produces in FIG. 1. In the repeater 20-7, the two modulators MOD1 and MOD2 directly modulate their respective input optical signals with variable optical attenuation techniques or tunable filtering techniques.

The upstream modulator MOD1 is inserted between the upstream WDM coupler Cw1 and optical coupler C1, and the downstream modulator MOD2 is inserted between the downstream WDM coupler Cw2 and optical coupler C2. There may be two versions for those modulators MOD1 and MOD2: variable attenuators (VATTs) and acoustic-optic tunable filters (AOTFs).

Figure 20:
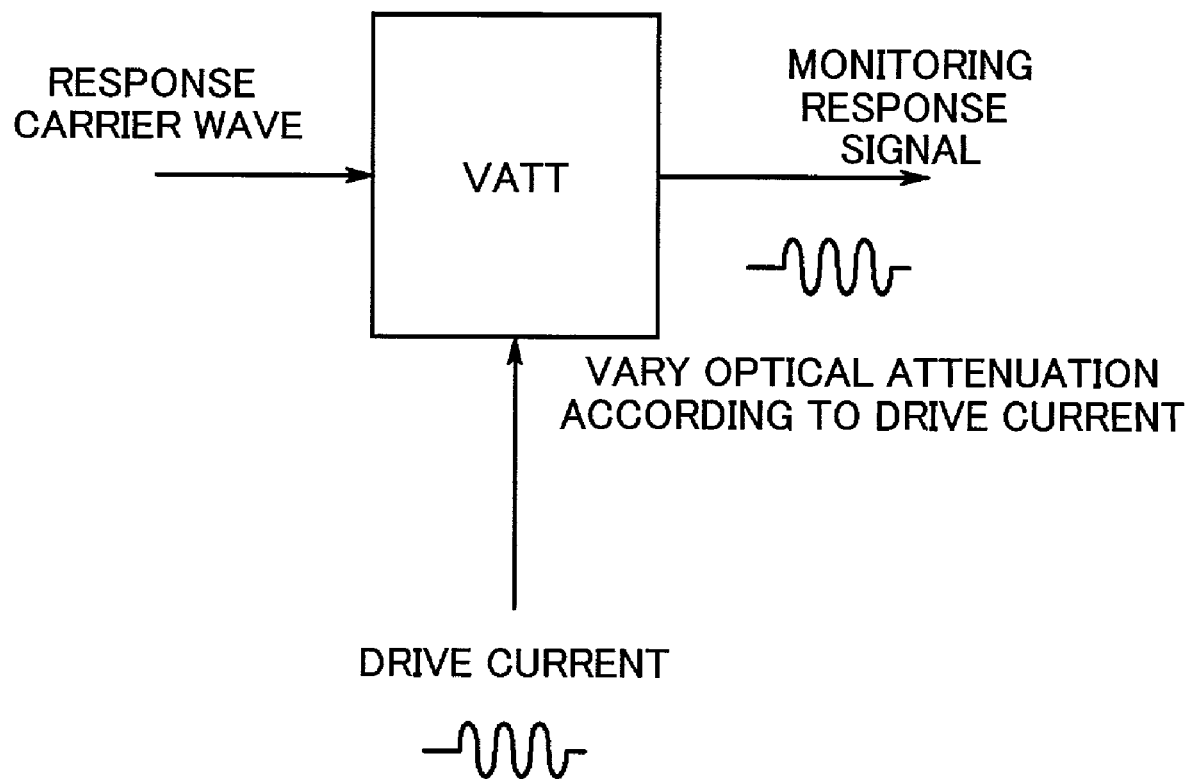
FIG. 20 shows modulation of a response carrier wave with a variable attenuator.

FIG. 20 shows modulation of a response carrier wave with a VATT. The illustrated VATT receives a response carrier wave from an end station and a driving current from the supervisory circuit SV which is modulated with a response message signal. Depending on the magnitude of its driving current, the VATT gives a different level of attenuation to the input signal. Accordingly, the response message signal is superimposed on the response carrier wave, resulting in an amplitude-modulated monitoring response signal.

Figure 21:
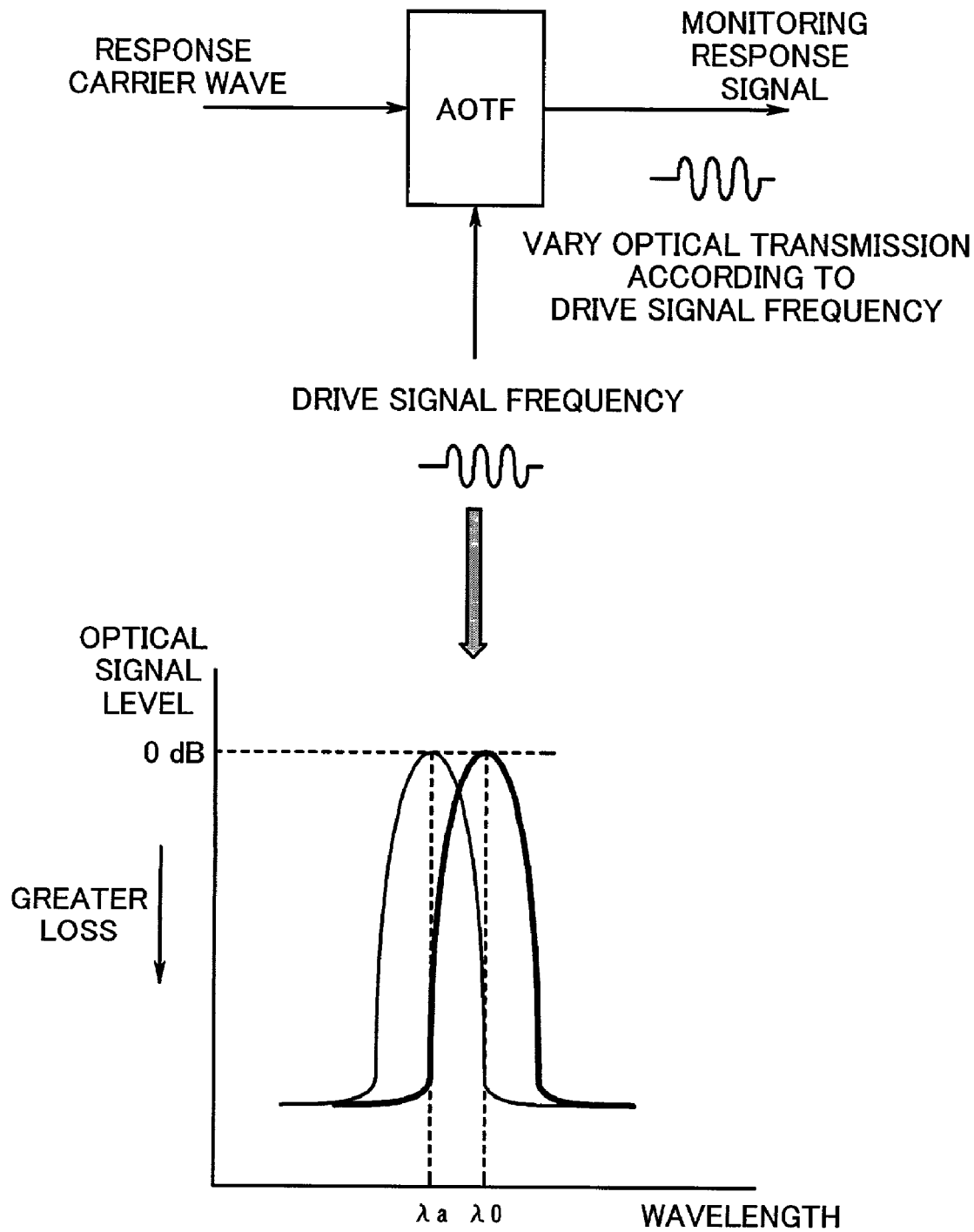
FIG. 21 shows modulation of a response carrier wave with an acoustic-optic tunable filter.

FIG. 21 shows modulation of a response carrier wave with an AOTF. The illustrated AOTF receives a response carrier wave from an end station and a driving current from the supervisory circuit SV which is modulated with response message. The AOTF is an optical filter that passes a particular range of optical waves, whose central wavelength can be controlled by changing the frequency of a radio wave signal applied to its driving signal input.

In the present example, the AOTF is designed to give a gain of 0 dB at the central wavelength $\lambda 0 = \lambda r$; that is, it passes response carrier waves without any losses when its central wavelength is tuned to $\lambda r$. Suppose, for example, that the driving frequency is varied so that the central frequency be shifted from $\lambda 0$ to $\lambda a$, as shown in the lower half of FIG. 21. This change gives an increased optical loss to the wavelength $\lambda 0$, which results in an attenuated output. As such, the AOTF modulates the amplitude of the response carrier wave, thus creating an amplitude-modulated monitoring response signal.

Figure 22:
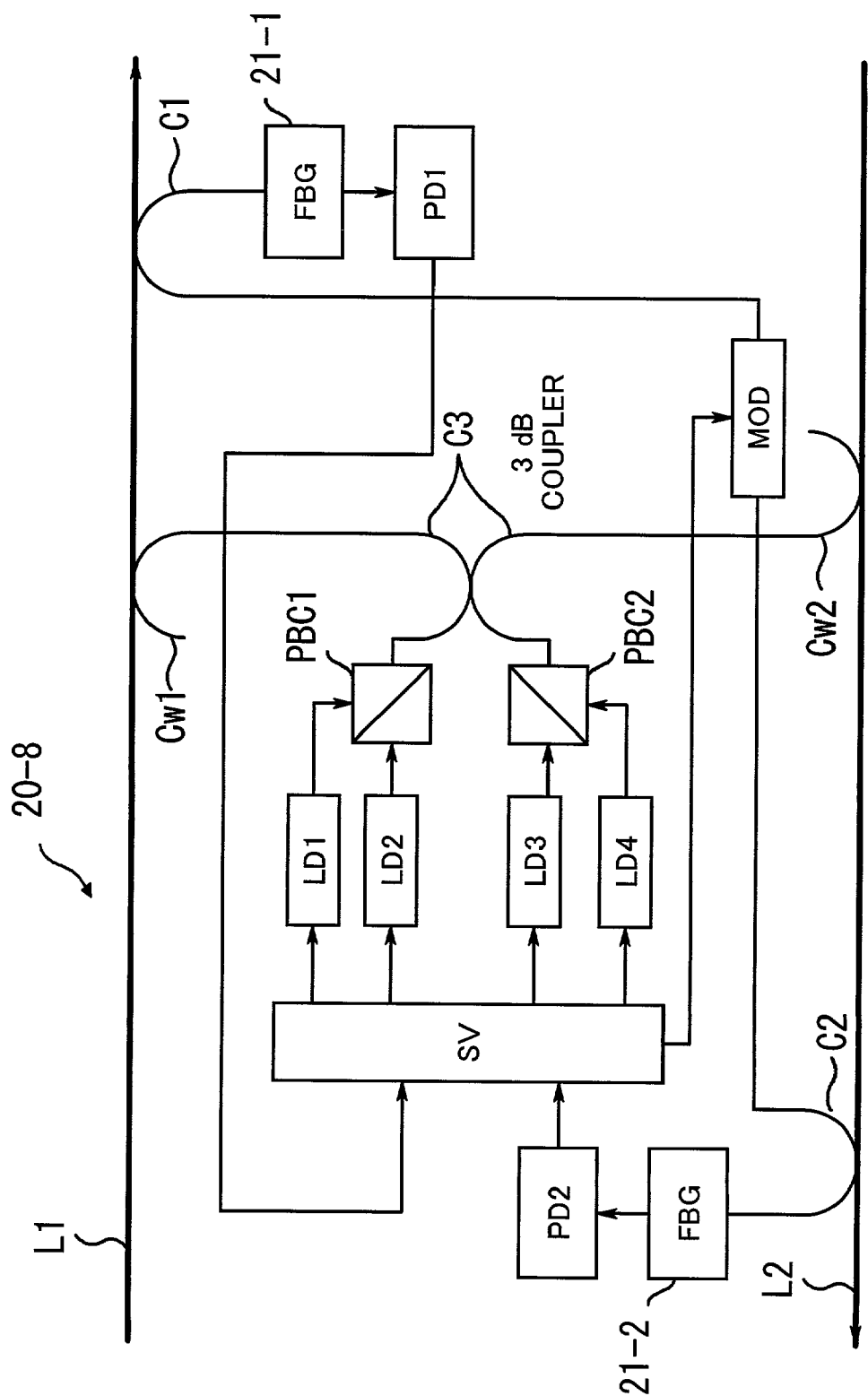
FIG. 22 is a block diagram of an eighth embodiment of the present invention.

FIG. 22 is a block diagram of a repeater 20-8 according to an eighth embodiment of the present invention. Unlike the previously described repeater 20-7 of FIG. 19, this repeater 20-8 is equipped with a single modulator (MOD) inserted between the upstream and downstream optical couplers C1 and C2 to produce a modulated monitoring response signal. This structure is advantageous over the preceding repeater 20-7 in terms of the number of required modulating devices.

Figure 23:
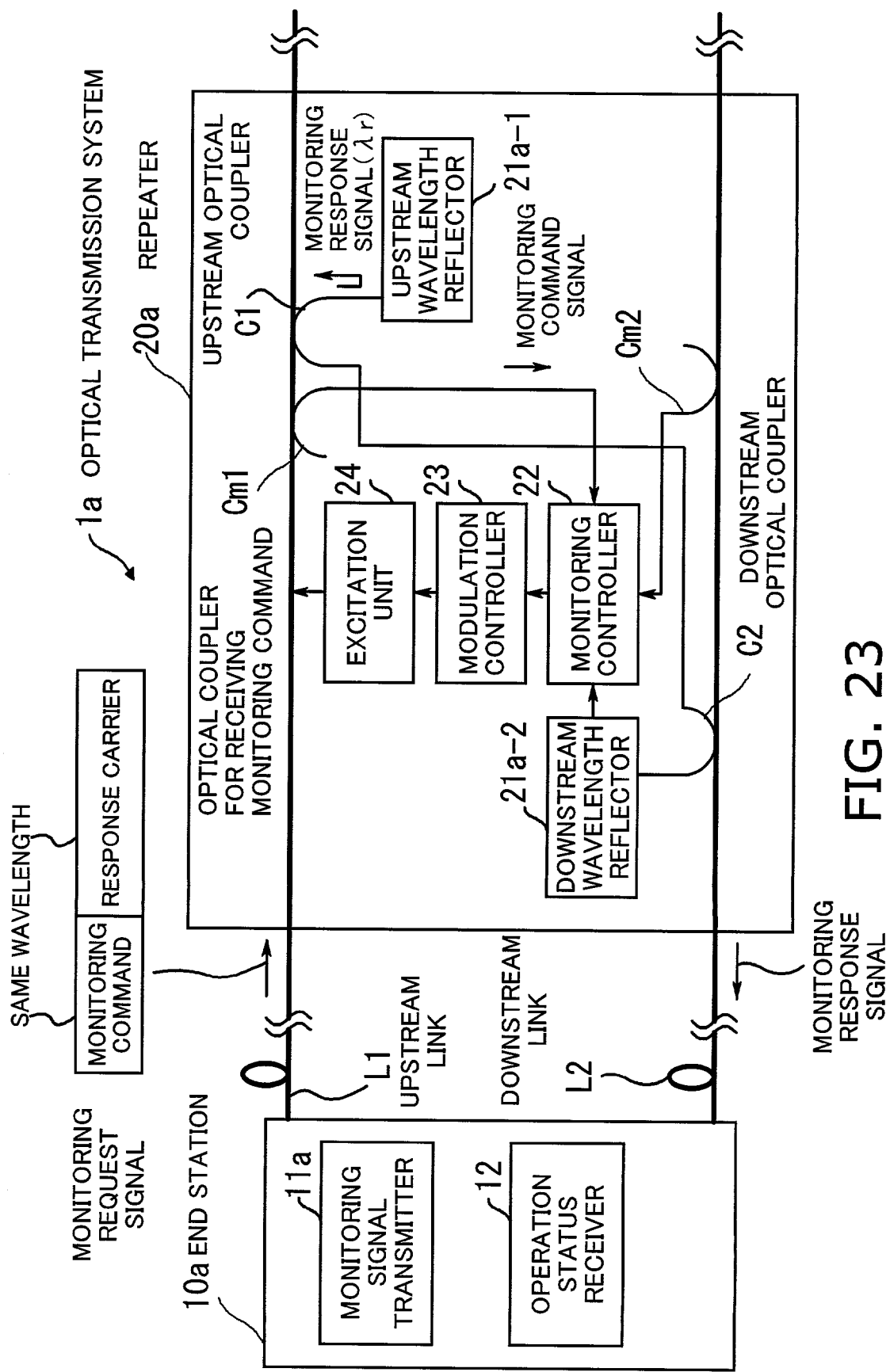
FIG. 23 is a conceptual view of another version of the proposed optical transmission system.
Figure 24:
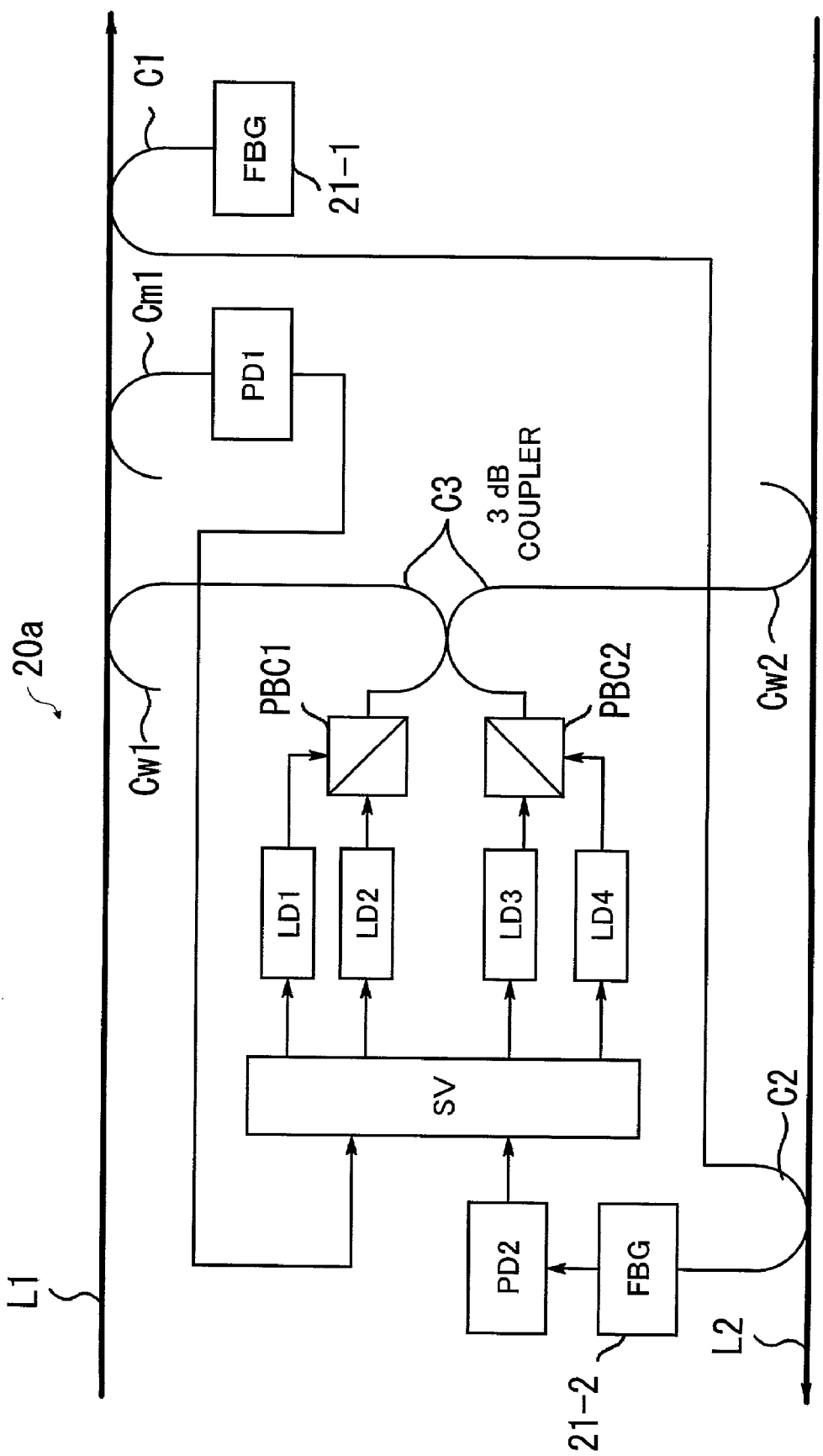
FIG. 24 shows a repeater according to the concept of FIG. 23.

The above-described eight different embodiments are based on the system architecture shown in FIG. 1. Referring now to FIGS. 23 and 24, another version of the optical transmission system 1 is presented. FIG. 23 is a conceptual view of an optical transmission system 1a, which illustrates an end station 10a and repeater 20a. Since the elements of this system is similar to what have already been discussed in FIG. 1, the following explanation will concentrate on its distinctive features, while affixing like reference numerals to like elements.

The end station 10a has a monitoring signal transmitter 11a which sends a monitoring request signal to the repeater 20a through the upstream link L1. The monitoring request signal includes a monitoring command signal and a response carrier wave. Unlike the system 1 of FIG. 1, however, the same wavelength is used to carry those two components of the monitoring request signal.

The illustrated repeater 20a employs two additional optical couplers Cm1 and Cm2 to receive monitoring command signals from the upstream link L1 and downstream link L2, respectively. The outputs of these optical couplers Cm1 and Cm2 are directed to the monitoring controller 22, which extracts a monitoring command signal addressed to itself and proceeds to status reporting activities. The resultant monitoring response signal is reflected back at an upstream wavelength reflector 21a-1 (or downstream wavelength reflector 21a-2 in the case the other end station is requesting). These two reflectors 21a-1 and 21a-2 are fiber Bragg gratings similar to the FBGs 21-1 and 21-2, which are used as wavelength selectors 21 in the optical transmission system 1 (FIG. 1).

FIG. 24 is a block diagram of a repeater 20a according to a ninth embodiment based on the concept of FIG. 23. This repeater 20a has optical couplers Cm1 and Cm2 attached on the upstream link L1 and downstream link L2, respectively, to route the branched optical signals to photodiodes PD1 and PD2. The received optical signals are converted into electric signals for command interpretation and execution in the supervisory circuit SV. With this structure, the end stations can be configured to send both monitoring command signals and response carrier waves using a single wavelength channel.

As seen from the above-described nine different embodiments, the present invention enables monitoring of operating status of Raman-amplifier repeaters 20 even when an optical transmission line is disrupted by a fiber failure or breakage. While all the embodiments are configured to send a response carrier wave regardless of whether there is a fiber fault, the present invention should not be limited to this configuration. Alternatively, the end stations may provide response carrier waves only when a link failure is encountered. In normal situations, where incoming optical transmission signals are available on the downstream link L2, the end stations send monitoring command signals, but no response carrier waves. Repeaters then produce monitoring response signals by superimposing their response message on the optical transmission signals.

The above discussion will now be summarized as follows. According to the proposed optical transmission system, an end station sends to repeaters a monitoring request signal including a monitoring command signal and response carrier wave. Repeaters are equipped with optical amplifiers that use fiber-optic transmission lines as the amplification medium. The optical fiber amplifiers are also used to superimpose a response message on the received monitoring carrier wave, and the resultant monitoring response signal is sent back to the requesting end station. The proposed system structure permits the repeaters to respond to monitoring command signals even when an optical transmission line is partly disrupted by a fiber failure or breakage, thus contributing to improvement of optical communication systems in terms of reliability and quality of service.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system which transports information over fiber-optic transmission lines of upstream and downstream links, comprising:
   (a) an end station comprising:
   monitoring signal transmission means for transmitting over the upstream link a monitoring request signal including a monitoring command signal with a first optical wavelength and a response carrier wave with a second optical wavelength which is different from the first optical wavelength, the monitoring command signal requesting a specified repeater to provide information about operating status thereof, the response carrier wave being a carrier wave for the specified repeater to return the requested information as a monitoring response signal, and
   operating status receiving means for receiving the monitoring response signal and identifying the operating status of the specified repeater from the received monitoring response signal; and
   (b) a repeater comprising:
   an upstream optical coupler, attached to the upstream link, which has a first port for splitting off a part of upstream transmission signals including the monitoring request signal sent from said end station and a second port for taking out an optical signal that enters the first port,
   an upstream wavelength selection means, coupled to the first port of said upstream optical coupler, for selectively passing the first optical wavelength and reflecting back the second optical wavelength, thereby extracting the monitoring command signal from the monitoring request signal received through said upstream optical coupler while reflecting the response carrier wave back to the first port,
   monitoring control means, responsive to the monitoring command signal supplied from said upstream wavelength selection means, for collecting information about operating status of said repeater, and encoding the collected information into a response message signal,
   excitation means for supplying a pump beam into the fiber-optic transmission line of the upstream link to perform optical amplification using the fiber-optic transmission line as an amplifying medium,
   modulation control means, coupled to said excitation means, for modulating the pump beam with the response message signal, whereby the response message signal is superimposed on the response carrier wave propagating on the upstream link and the resulting monitoring response signal reaches said upstream optical coupler, and
   a downstream optical coupler, attached to the downstream link, which has a port to accept the monitoring response signal from the second port of said upstream optical coupler and direct the monitoring response signal into the downstream link for delivery to said operating status receiving means in said end station.

2. The optical transmission system according to claim 1, wherein said upstream wavelength selection means is a fiber grating device which selectively reflects back the second optical wavelength.

3. The optical transmission system according to claim 1, wherein said modulation control means performs amplitude modulation, thereby causing the response carrier wave to be amplitude-modulated.

4. The optical transmission system according to claim 1, wherein said excitation means comprises a WDM coupler which supplies the modulated pump beam into the fiber-optic transmission line to perform either of forward pumping, backward pumping, and two-way pumping.

5. The optical transmission system according to claim 4, wherein said repeater further comprises an optical isolator disposed between said upstream optical coupler and WDM coupler.

6. The optical transmission system according to claim 1, wherein said excitation means further performs erbium-doped fiber amplification.

7. The optical transmission system according to claim 1, wherein:
   said monitoring signal transmission means stops sending the response carrier wave when incoming optical transmission signals are available on the downstream link; and
   said excitation means further supplies the modulated pump beam into the fiber-optic transmission line of the downstream link, whereby the response message signal is superimposed on the incoming optical transmission signals on the downstream link.

8. The optical transmission system according to claim 1, wherein said modulation control means is configured with a variable modulation factor, including a maximum modulation factor to be applied when in out-of-service state.

9. The optical transmission system according to claim 1, which comprises a plurality of said repeaters, wherein:
   said each repeater further comprises a downstream wavelength selection means coupled to said downstream optical coupler; and
   said upstream and downstream wavelength selection means in said plurality of repeaters have the same reflecting wavelength.

10. The optical transmission system according to claim 1, which comprises a plurality of said repeaters, wherein:
    said each repeater further comprises a downstream wavelength selection means coupled to said downstream optical coupler; and
    said upstream and downstream wavelength selection means in said plurality of repeaters have different reflecting wavelengths from each other.

11. The optical transmission system according to claim 1, which comprises a plurality of said repeaters, wherein:
    said repeater further comprises a downstream wavelength selection means coupled to said downstream optical coupler; and
    said downstream wavelength selection means in said plurality of repeaters have a common reflecting wavelength that is different from what said upstream wavelength selection means reflect equally.

12. The optical transmission system according to claim 1, wherein:
    the information signals are wavelength-division multiplexed signals having wavelengths of $\lambda 1$ to $\lambda n$ (n:integer); and
    the monitoring signal transmission means assigns either of the shortest wavelength $\lambda 1$, the longest wavelength $\lambda n$, and an intermediary wavelength between two consecutive wavelengths $\lambda m$ and $\lambda m+1$ (m<n) to the second optical wavelength.

13. An optical transmission system which transports information over fiber-optic transmission lines of upstream and downstream links, comprising:
    (a) an end station comprising:
    monitoring signal transmission means for transmitting over the upstream link a monitoring request signal including a monitoring command signal with a first optical wavelength and a response carrier wave with a second optical wavelength which is different from the first optical wavelength, the monitoring command signal requesting a specified repeater to provide information about operating status thereof, the response carrier wave being a carrier wave for the specified repeater to return the requested information as a monitoring response signal, and operating status receiving means for receiving the monitoring response signal and identifying the operating status of the specified repeater from the received monitoring response signal; and (b) a repeater comprising:

an upstream optical coupler, attached to the upstream link, which has a first port for splitting off a part of upstream transmission signals including the monitoring request signal sent from said end station and a second port for taking out an optical signal that enters the first port, an upstream wavelength selection means, coupled to the first port of said upstream optical coupler, for selectively passing the first optical wavelength and reflecting back the second optical wavelength, thereby extracting the monitoring command signal from the monitoring request signal received through said upstream optical coupler while reflecting the response carrier wave back to the first port, monitoring control means, responsive to the monitoring command signal supplied from said upstream wavelength selection means, for collecting information about operating status of said repeater, and encoding the collected information into a response message signal, monitoring response signal generating means, coupled to said monitoring control means, for producing a monitoring response signal by using an optical modulator to modulate the response carrier wave with the response message signal, the optical modulator using either of variable optical attenuation and tuned filtering techniques, and a downstream optical coupler, attached to the downstream link, which has a port to accept the monitoring response signal from the second port of said upstream optical coupler and direct the monitoring response signal into the downstream link for delivery to said operating status receiving means in said end station.

14. The optical transmission system according to claim 13, wherein said optical modulator is disposed between the second port of said upstream optical coupler and said downstream optical coupler.

15. A repeater in an optical transmission system which transports information over fiber-optic transmission lines of upstream and downstream links, comprising:

an upstream optical coupler, attached to the upstream link, which has a first port for splitting off a part of upstream transmission signals and a second port for taking out an optical signal that enters the first port, the split part of the upstream transmission signals including a monitoring request signal including a monitoring command signal with a first optical wavelength and a response carrier wave with a second optical wavelength which is different from the first optical wavelength, the monitoring command signal requesting a specified repeater to provide information about operating status thereof, the response carrier wave being a carrier wave for the specified repeater to return the requested information as a monitoring response signal;

an upstream wavelength selection means, coupled to the first port of said upstream optical coupler, for selectively passing the first optical wavelength and reflecting back the second optical wavelength, thereby extracting the monitoring command signal from the monitoring request signal received through said upstream optical coupler while reflecting the response carrier wave back to the first port;

monitoring control means, responsive to the monitoring command signal supplied from said upstream wavelength selection means, for collecting information about operating status of said repeater, and encoding the collected information into a response message signal;

excitation means for supplying a pump beam into the fiber-optic transmission line of the upstream link to perform optical amplification using the fiber-optic transmission line as an amplifying medium;

modulation control means, coupled to said excitation means, for modulating the pump beam with the response message signal, whereby the response message signal is superimposed on the response carrier wave propagating on the upstream link and the resulting monitoring response signal reaches said upstream optical coupler; and a downstream optical coupler, attached to the downstream link, which has a port to accept the monitoring response signal from the second port of said upstream optical coupler and direct the monitoring response signal into the downstream link.

16. An optical transmission system which transports information over fiber-optic transmission lines of upstream and downstream links, comprising:

(a) an end station comprising:

monitoring signal transmission means for transmitting over the upstream link a monitoring request signal including a monitoring command signal with a predetermined optical wavelength and a response carrier wave with the same predetermined optical wavelength, the monitoring command signal requesting a specified repeater to provide information about operating status thereof, the response carrier wave being a carrier wave for the specified repeater to return the requested information as a monitoring response signal, and operating status receiving means for receiving the monitoring response signal and identifying the operating status of the specified repeater from the received monitoring response signal; and (b) a repeater comprising:

a first upstream optical coupler, attached to the upstream link, which has a first port for splitting off a part of upstream transmission signals, including the monitoring request signal, and a second port for taking out an optical signal that enters the first port, an upstream wavelength reflection means, coupled to the first port of said first upstream optical coupler, for selectively reflecting back the predetermined optical wavelength, a second upstream optical coupler, attached to the upstream link, for receiving the monitoring command signal, monitoring control means, responsive to the monitoring command signal received by said second upstream optical coupler, for collecting information about operating status of said repeater, and encoding the collected information into a response message signal, excitation means for supplying a pump beam into the fiber-optic transmission line of the upstream link to perform optical amplification using the fiber-optic transmission line as an amplifying medium, modulation control means, coupled to said excitation means, for modulating the pump beam with the response message signal, whereby the response message signal is superimposed on the response carrier wave propagating on the upstream link and the resulting monitoring response signal reaches said first upstream optical coupler, and a downstream optical coupler, attached to the downstream link, which has a port to accept the monitoring response signal from the second port of said first upstream optical coupler and direct the monitoring response signal into the downstream link for delivery to said operating status receiving means in said end station.

17. A repeater in an optical transmission system which transports information over fiber-optic transmission lines of upstream and downstream links, comprising:

a first upstream optical coupler, attached to the upstream link, which has a first port for splitting off a part of upstream transmission signals and a second port for taking out an optical signal that enters the first port, the split part of the upstream transmission signals including a monitoring request signal including a monitoring command signal with a predetermined optical wavelength and a response carrier wave with the same predetermined optical wavelength, the monitoring command signal requesting said repeater to provide information about operating status thereof, the response carrier wave being a carrier wave for the specified repeater to return the requested information as a monitoring response signal;

an upstream wavelength reflection means, coupled to the first port of said first upstream optical coupler, for selectively reflecting back the predetermined optical wavelength;

a second upstream optical coupler, attached to the upstream link, for receiving the monitoring command signal;

monitoring control means, responsive to the monitoring command signal received by said second upstream optical coupler, for collecting information about operating status of said repeater, and encoding the collected information into a response message signal;

excitation means for supplying a pump beam into the fiber-optic transmission line of the upstream link to perform optical amplification using the fiber-optic transmission line as an amplifying medium;

modulation control means, coupled to said excitation means, for modulating the pump beam with the response message signal, whereby the response message signal is superimposed on the response carrier wave propagating on the upstream link and the resulting monitoring response signal reaches said first upstream optical coupler; and a downstream optical coupler, attached to the downstream link, which has a port to accept the monitoring response signal from the second port of said first upstream optical coupler and direct the monitoring response signal into the downstream link.

* * * * *